United States Patent
Cha et al.

(10) Patent No.: US 11,743,007 B2
(45) Date of Patent: Aug. 29, 2023

(54) METHOD FOR TRANSMITTING AND RECEIVING POSITIONING REFERENCE SIGNAL AND APPARATUS THEREFOR

(71) Applicant: LG ELECTRONICS INC., Seoul (KR)

(72) Inventors: Hyunsu Cha, Seoul (KR); Hyunsoo Ko, Seoul (KR); Kijun Kim, Seoul (KR); Sukhyon Yoon, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 36 days.

(21) Appl. No.: 17/272,748

(22) PCT Filed: Sep. 5, 2019

(86) PCT No.: PCT/KR2019/011477
§ 371 (c)(1),
(2) Date: Mar. 2, 2021

(87) PCT Pub. No.: WO2020/050646
PCT Pub. Date: Mar. 12, 2020

(65) Prior Publication Data
US 2021/0320769 A1    Oct. 14, 2021

(30) Foreign Application Priority Data
Sep. 5, 2018  (KR) .................. 10-2018-0105769

(51) Int. Cl.
*H04L 5/00* (2006.01)
*H04W 4/029* (2018.01)
(Continued)

(52) U.S. Cl.
CPC .......... *H04L 5/0048* (2013.01); *G01S 5/0236* (2013.01); *G01S 5/10* (2013.01); *H04L 5/0053* (2013.01); *H04W 4/029* (2018.02)

(58) Field of Classification Search
CPC .... H04L 5/0048; H04L 5/0053; H04W 4/029; G01S 5/0236; G01S 5/10
See application file for complete search history.

(56) References Cited

U.S. PATENT DOCUMENTS 11,310,760 B2 *  4/2022  Yamada ................ H04L 5/0051
2015/0215884 A1   7/2015  Horvat et al.
(Continued)

FOREIGN PATENT DOCUMENTS

KR    1020180039122 A    4/2018
WO       2015180801 A1   12/2015

*Primary Examiner* — Muthuswamy G Manoharan
(74) *Attorney, Agent, or Firm* — BRYAN CAVE LEIGHTON PAISNER LLP

(57) ABSTRACT

Disclosed in the present invention is a method for receiving, by a terminal, a positioning reference signal (PRS) in a wireless communication system. In particular, the method comprises the steps of: receiving information related to a PRS search window for receiving a first PRS; receiving a plurality of first PRSs from a plurality of base stations on the basis of the first PRS search window; determining at least one second PRS search window on the basis of the plurality of first PRSs and the first PRS search window; and receiving a plurality of second PRSs from at least some of the base stations on the basis of the at least one second PRS search window.

15 Claims, 25 Drawing Sheets

(51) Int. Cl.
   *G01S 5/10*   (2006.01)
   *G01S 5/02*   (2010.01)

(56) References Cited

U.S. PATENT DOCUMENTS

| | | | |
|---|---|---|---|
| 2017/0171857 A1* | 6/2017 | Lee | G01S 5/00 |
| 2017/0238298 A1 | 8/2017 | Wang et al. | |
| 2017/0374638 A1 | 12/2017 | Han et al. | |
| 2018/0098187 A1* | 4/2018 | Blankenship | H04L 27/2602 |
| 2018/0324738 A1* | 11/2018 | Stirling-Gallacher | G01S 1/54 |

* cited by examiner (A) CONTROL-PLANE PROTOCOL STACK (B) USER-PLANE PROTOCOL STACK (a)

(b)

METHOD FOR TRANSMITTING AND RECEIVING POSITIONING REFERENCE SIGNAL AND APPARATUS THEREFOR

This application is the National Stage filing under 35 U.S.C. 371 of International Application No. PCT/KR2019/011477, filed on Sep. 5, 2019, which claims priority to Korean Patent Application No. 10-2018-0105769, filed on Sep. 5, 2018, the contents of which are all hereby incorporated by reference herein in their entirety.

TECHNICAL FIELD

The present disclosure relates to a method of transmitting and receiving a positioning reference signal (PRS) and an apparatus therefor. More particularly, the present disclosure relates to a method of adjusting a search window for receiving PRSs and identifying a base station (BS)/transmission point (TP) by which the PRSs are transmitted, and an apparatus therefor.

BACKGROUND ART

As more and more communication devices demand larger communication traffic along with the current trends, a future-generation 5th generation (5G) system is required to provide an enhanced wireless broadband communication, compared to the legacy LTE system. In the future-generation 5G system, communication scenarios are divided into enhanced mobile broadband (eMBB), ultra-reliability and low-latency communication (URLLC), massive machine-type communication (mMTC), and so on.

Herein, eMBB is a future-generation mobile communication scenario characterized by high spectral efficiency, high user experienced data rate, and high peak data rate, URLLC is a future-generation mobile communication scenario characterized by ultra-high reliability, ultra-low latency, and ultra-high availability (e.g., vehicle to everything (V2X), emergency service, and remote control), and mMTC is a future-generation mobile communication scenario characterized by low cost, low energy, short packet, and massive connectivity (e.g., Internet of things (IoT)).

DETAILED DESCRIPTION OF THE DISCLOSURE

Technical Problems

The present disclosure provides a method of transmitting and receiving a positioning reference signal (PRS) and an apparatus therefor.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solutions

According to an aspect of the present disclosure, provided herein is a method of receiving a positioning reference signal (PRS) by a user equipment (UE) in a wireless communication system, including receiving information related to a first PRS search window for receiving a first PRS, receiving a plurality of first PRSs from a plurality of base stations (BSs) based on the first PRS search window, determining at least one second PRS search window based on the plural first PRSs and the first PRS search window, and receiving a plurality of second PRSs from at least a part of the plural BSs based on the at least one second PRS search window.

The plural first PRSs may have an identical sequence.

The plural first PRSs may have different sequences.

The plural BSs may be categorized into a plurality of BS groups, and each of the at least one second PRS search window may be determined for each of the plural BS groups.

The plural BSs may be categorized into a plurality of BS groups, and first PRSs received from BSs included in a same BS group among the plural BS groups may be received on same time and frequency resources.

The at least part of the plural BSs may be BSs related with a first PRS having a first peak value calculated based on the plural first PRSs, greater than a threshold value.

A bandwidth part (BWP) for each of the plural first PRSs and the plural second PRSs may be related to a PRS resource identification for each of the plural first PRSs and the plural second PRSs.

The plural first PRSs may be related to narrowband-based PRSs, and the plural second PRSs may be related to wideband-based PRSs.

The method may further include transmitting positioning information measured based on the plural second PRSs, and the positioning information may include a first index associated with a reference signal time difference (RSTD) measured based on the plural second PRSs, among indexes included in an RSTD table configured for the UE, and a second index determined based on the measured RSTD, among a plurality of indexes obtained by quantizing RSRD associated with the indexes included in the RSTD table.

Determining the at least one second PRS search window may include reporting positioning information calculated based on the plural first PRSs, receiving information related to the at least one second PRS search window based on the positioning information, and determining the at least one second PRS search window based on the information related to the at least one second PRS search window and the first PRS search window.

In another aspect of the present disclosure, provided herein is a method of receiving a positioning reference signal (PRS) by a user equipment (UE) in a wireless communication system, including receiving information related to a PRS resource set including a plurality of PRS resources, and receiving a plurality of PRSs on the plurality of PRS resources, wherein the plural PRS resources included in the PRS resource set may be associated with a same base station (BS).

The plural PRSs may be received from the same BS.

Spatially quasi co-located PRSs among the plural PRSs may be received through a same transmission beam.

In another aspect of the present disclosure, provided herein is an apparatus for receiving a positioning reference signal (PRS) in a wireless communication system, including at least one processor; and at least one memory operably connected to the at least one processor and configured to store instructions for causing the at least one processor to perform a specific operation based on execution of the at least one processor, wherein the specific operation includes receiving information related to a first PRS search window for receiving a first PRS, receiving a plurality of first PRSs from a plurality of base stations (BSs) based on the first PRS search window, determining at least one second PRS search window based on the plural first PRSs and the first PRS search window, and receiving a plurality of second PRSs from at least a part of the plural BSs based on the at least one second PRS search window.

In another aspect of the present disclosure, provided herein is an apparatus for receiving a positioning reference signal (PRS) in a wireless communication system, including at least one processor; and at least one memory operably connected to the at least one processor and configured to store instructions for causing the at least one processor to perform a specific operation based on execution of the at least one processor, wherein the specific operation includes receiving information related to a PRS resource set including a plurality of PRS resources, and receiving a plurality of PRSs on the plurality of PRS resources, and the plural PRS resources included in the PRS resource set are associated with a same base station (BS).

Advantageous Effects

According to the present disclosure, accuracy of location measurement of a UE may be raised by efficiently identifying a base station (BS)/transmission point (TP) by which a positioning reference signal is transmitted and effectively adjusting a search window for the positioning reference signal.

It will be appreciated by persons skilled in the art that the effects that can be achieved with the present disclosure are not limited to what has been particularly described hereinabove and other advantages of the present disclosure will be more clearly understood from the following detailed description taken in conjunction with the accompanying drawings.

BEST MODE FOR CARRYING OUT THE DISCLOSURE

Figure 1:
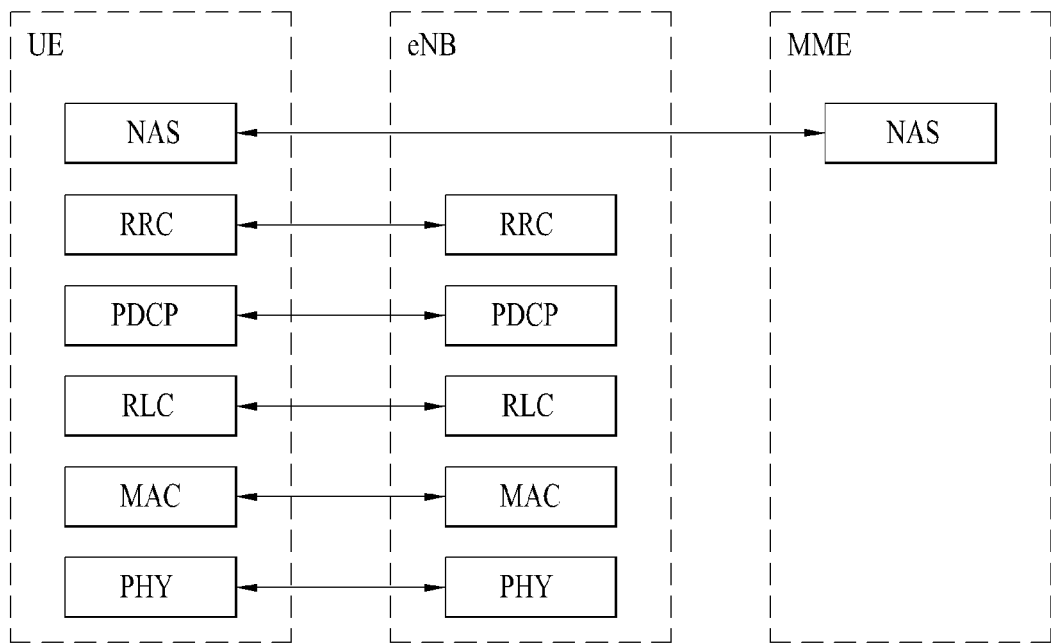
FIG. 1 is a diagram illustrating the control-plane and user-plane architecture of radio interface protocols between a user equipment (UE) and an evolved UMTS terrestrial radio access network (E-UTRAN) in conformance to a 3rd generation partnership project (3GPP) radio access network standard.
Figure 1:
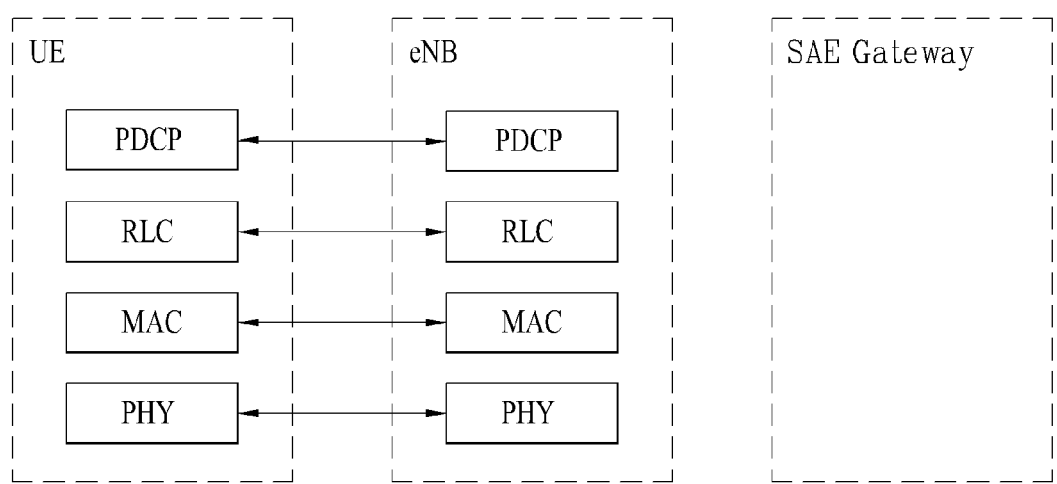

The configuration, operation, and other features of the present disclosure will readily be understood with embodiments of the present disclosure described with reference to the attached drawings. Embodiments of the present disclosure as set forth herein are examples in which the technical features of the present disclosure are applied to a $3^{rd}$ generation partnership project (3GPP) system.

While embodiments of the present disclosure are described in the context of long term evolution (LTE) and LTE-advanced (LTE-A) systems, they are purely exemplary. Therefore, the embodiments of the present disclosure are applicable to any other communication system as long as the above definitions are valid for the communication system.

The term, base station (BS) may be used to cover the meanings of terms including remote radio head (RRH), evolved Node B (eNB or eNode B), transmission point (TP), reception point (RP), relay, and so on.

The 3GPP communication standards define downlink (DL) physical channels corresponding to resource elements (REs) carrying information originated from a higher layer, and DL physical signals which are used in the physical layer and correspond to REs which do not carry information originated from a higher layer. For example, physical downlink shared channel (PDSCH), physical broadcast channel (PBCH), physical multicast channel (PMCH), physical control format indicator channel (PCFICH), physical downlink control channel (PDCCH), and physical hybrid ARQ indicator channel (PHICH) are defined as DL physical channels, and reference signals (RSs) and synchronization signals (SSs) are defined as DL physical signals. An RS, also called a pilot signal, is a signal with a predefined special waveform known to both a gNode B (gNB) and a user equipment (UE). For example, cell specific RS, UE-specific RS (UE-RS), positioning RS (PRS), and channel state information RS (CSI-RS) are defined as DL RSs. The 3GPP LTE/LTE-A standards define uplink (UL) physical channels corresponding to REs carrying information originated from a higher layer, and UL physical signals which are used in the physical layer and correspond to REs which do not carry information originated from a higher layer. For example, physical uplink shared channel (PUSCH), physical uplink control channel (PUCCH), and physical random access channel (PRACH) are defined as UL physical channels, and a demodulation reference signal (DMRS) for a UL control/data signal, and a sounding reference signal (SRS) used for UL channel measurement are defined as UL physical signals.

In the present disclosure, the PDCCH/PCFICH/PHICH/PDSCH refers to a set of time-frequency resources or a set of REs, which carry downlink control information (DCI)/a control format indicator (CFI)/a DL acknowledgement/negative acknowledgement (ACK/NACK)/DL data. Further, the PUCCH/PUSCH/PRACH refers to a set of time-frequency resources or a set of REs, which carry UL control information (UCI)/UL data/a random access signal. In the present disclosure, particularly a time-frequency resource or an RE which is allocated to or belongs to the PDCCH/PCFICH/PHICH/PDSCH/PUCCH/PUSCH/PRACH is referred to as a PDCCH RE/PCFICH RE/PHICH RE/PDSCH RE/PUCCH RE/PUSCH RE/PRACH RE or a PDCCH resource/PCFICH resource/PHICH resource/PDSCH resource/PUCCH resource/PUSCH resource/PRACH resource. Hereinbelow, if it is said that a UE transmits a PUCCH/PUSCH/PRACH, this means that UCI/UL data/a random access signal is transmitted on or through the PUCCH/PUSCH/PRACH. Further, if it is said that a gNB transmits a PDCCH/PCFICH/PHICH/PDSCH, this means that DCI/control information is transmitted on or through the PDCCH/PCFICH/PHICH/PDSCH.

Hereinbelow, an orthogonal frequency division multiplexing (OFDM) symbol/carrier/subcarrier/RE to which a CRS/DMRS/CSI-RS/SRS/UE-RS is allocated to or for which the CRS/DMRS/CSI-RS/SRS/UE-RS is configured is referred to as a CRS/DMRS/CSI-RS/SRS/UE-RS symbol/carrier/subcarrier/RE. For example, an OFDM symbol to which a tracking RS (TRS) is allocated or for which the TRS is configured is referred to as a TRS symbol, a subcarrier to which a TRS is allocated or for which the TRS is configured is referred to as a TRS subcarrier, and an RE to which a TRS is allocated or for which the TRS is configured is referred to as a TRS RE. Further, a subframe configured to transmit a TRS is referred to as a TRS subframe. Further, a subframe carrying a broadcast signal is referred to as a broadcast subframe or a PBCH subframe, and a subframe carrying a synchronization signal (SS) (e.g., a primary synchronization signal (PSS) and/or a secondary synchronization signal (SSS)) is referred to as an SS subframe or a PSS/SSS subframe. An OFDM symbol/subcarrier/RE to which a PSS/SSS is allocated or for which the PSS/SSS is configured is referred to as a PSS/SSS symbol/subcarrier/RE.

In the present disclosure, a CRS port, a UE-RS port, a CSI-RS port, and a TRS port refer to an antenna port configured to transmit a CRS, an antenna port configured to transmit a UE-RS, an antenna port configured to transmit a CSI-RS, and an antenna port configured to transmit a TRS, respectively. Antenna port configured to transmit CRSs may be distinguished from each other by the positions of REs occupied by the CRSs according to CRS ports, antenna ports configured to transmit UE-RSs may be distinguished from each other by the positions of REs occupied by the UE-RSs according to UE-RS ports, and antenna ports configured to transmit CSI-RSs may be distinguished from each other by the positions of REs occupied by the CSI-RSs according to CSI-RS ports. Therefore, the term CRS/UE-RS/CSI-RS/TRS port is also used to refer to a pattern of REs occupied by a CRS/UE-RS/CSI-RS/TRS in a predetermined resource area.

Now, multiple use cases in a 5G communication system including the NR system will be described in detail.

Three main requirement categories for 5G include (1) a category of enhanced mobile broadband (eMBB), (2) a category of massive machine type communication (mMTC), and (3) a category of ultra-reliable and low latency communications (URLLC).

Partial use cases may require a plurality of categories for optimization and other use cases may focus only upon one key performance indicator (KPI). 5G supports such various use cases using a flexible and reliable method.

eMBB far surpasses basic mobile Internet access and covers abundant bidirectional tasks and media and entertainment applications in cloud and augmented reality. Data is one of 5G core motive forces and, in a 5G era, a dedicated voice service may not be provided for the first time. In 5G, it is expected that voice will be simply processed as an application program using data connection provided by a communication system. Main causes for increased traffic volume are due to an increase in the size of content and an increase in the number of applications requiring high data transmission rate. A streaming service (of audio and video), conversational video, and mobile Internet access will be more widely used as more devices are connected to the Internet. These many application programs require connectivity of an always turned-on state in order to push real-time information and alarm for users. Cloud storage and applications are rapidly increasing in a mobile communication platform and may be applied to both tasks and entertainment. The cloud storage is a special use case which accelerates growth of uplink data transmission rate. 5G is also used for a remote task of cloud. When a tactile interface is used, 5G demands much lower end-to-end latency to maintain user good experience. Entertainment, for example, cloud gaming and video streaming, is another core element which increases demand for mobile broadband capability. Entertainment is essential for a smartphone and a tablet in any place including high mobility environments such as a train, a vehicle, and an airplane. Other use cases are augmented reality for entertainment and information search. In this case, the augmented reality requires very low latency and instantaneous data volume.

In addition, one of the most expected 5G use cases relates a function capable of smoothly connecting embedded sensors in all fields, i.e., mMTC. It is expected that the number of potential IoT devices will reach 20.4 billion up to the year of 2020. An industrial IoT is one of categories of performing a main role enabling a smart city, asset tracking, smart utility, agriculture, and security infrastructure through 5G.

URLLC includes a new service that will change industry through remote control of main infrastructure and an ultra-reliable/available low-latency link such as a self-driving vehicle. A level of reliability and latency is essential for smart grid control, industrial automation, robotics, and drone control and adjustment.

Next, a plurality of use cases in the 5G communication system including the NR system will be described in more detail.

5G may complement fiber-to-the home (FTTH) and cable-based broadband (or data-over-cable service interface specifications (DOCSIS)) as a means of providing streams at data rates of hundreds of megabits per second to giga bits per second. Such a high speed is required for TV broadcasts at or above a resolution of 4K (6K, 8K, and higher) as well as virtual reality (VR) and AR. VR and AR applications mostly include immersive sport games. A special network configuration may be required for a specific application program. For VR games, for example, game companies may have to integrate a core server with an edge network server of a network operator in order to minimize latency.

The automotive sector is expected to be a very important new driver for 5G, with many use cases for mobile communications for vehicles. For example, entertainment for passengers requires simultaneous high capacity and high mobility mobile broadband, because future users will expect to continue their good quality connection independent of their location and speed. Other use cases for the automotive sector are AR dashboards. These display overlay information on top of what a driver is seeing through the front window, identifying objects in the dark and telling the driver about the distances and movements of the objects. In the future, wireless modules will enable communication between vehicles themselves, information exchange between vehicles and supporting infrastructure and between vehicles and other connected devices (e.g., those carried by pedestrians). Safety systems may guide drivers on alternative courses of action to allow them to drive more safely and lower the risks of accidents. The next stage will be remote-controlled or self-driving vehicles. These require very reliable, very fast communication between different self-driving vehicles and between vehicles and infrastructure. In the future, self-driving vehicles will execute all driving activities, while drivers are focusing on traffic abnormality elusive to the vehicles themselves. The technical requirements for self-driving vehicles call for ultra-low latencies and ultra-high reliability, increasing traffic safety to levels humans cannot achieve.

Smart cities and smart homes, often referred to as smart society, will be embedded with dense wireless sensor networks. Distributed networks of intelligent sensors will identify conditions for cost- and energy-efficient maintenance of the city or home. A similar setup can be done for each home, where temperature sensors, window and heating controllers, burglar alarms, and home appliances are all connected wirelessly. Many of these sensors are typically characterized by low data rate, low power, and low cost, but for example, real time high definition (HD) video may be required in some types of devices for surveillance.

The consumption and distribution of energy, including heat or gas, is becoming highly decentralized, creating the need for automated control of a very distributed sensor network. A smart grid interconnects such sensors, using digital information and communications technology to gather and act on information. This information may include information about the behaviors of suppliers and consumers, allowing the smart grid to improve the efficiency, reliability, economics and sustainability of the production and distribution of fuels such as electricity in an automated fashion. A smart grid may be seen as another sensor network with low delays.

The health sector has many applications that may benefit from mobile communications. Communications systems enable telemedicine, which provides clinical health care at a distance. It helps eliminate distance barriers and may improve access to medical services that would often not be consistently available in distant rural communities. It is also used to save lives in critical care and emergency situations. Wireless sensor networks based on mobile communication may provide remote monitoring and sensors for parameters such as heart rate and blood pressure.

Wireless and mobile communications are becoming increasingly important for industrial applications. Wires are expensive to install and maintain, and the possibility of replacing cables with reconfigurable wireless links is a tempting opportunity for many industries. However, achieving this requires that the wireless connection works with a similar delay, reliability and capacity as cables and that its management is simplified. Low delays and very low error probabilities are new requirements that need to be addressed with 5G.

Finally, logistics and freight tracking are important use cases for mobile communications that enable the tracking of inventory and packages wherever they are by using location-based information systems. The logistics and freight tracking use cases typically require lower data rates but need wide coverage and reliable location information.

FIG. 1 illustrates control-plane and user-plane protocol stacks in a radio interface protocol architecture conforming to a 3GPP wireless access network standard between a UE and an evolved UMTS terrestrial radio access network (E-UTRAN). The control plane is a path in which the UE and the E-UTRAN transmit control messages to manage calls, and the user plane is a path in which data generated from an application layer, for example, voice data or Internet packet data is transmitted.

A physical (PHY) layer at layer 1 (L1) provides information transfer service to its higher layer, a medium access control (MAC) layer. The PHY layer is connected to the MAC layer via transport channels. The transport channels deliver data between the MAC layer and the PHY layer. Data is transmitted on physical channels between the PHY layers of a transmitter and a receiver. The physical channels use time and frequency as radio resources. Specifically, the physical channels are modulated in orthogonal frequency division multiple access (OFDMA) for downlink (DL) and in single carrier frequency division multiple access (SC-FDMA) for uplink (UL).

The MAC layer at layer 2 (L2) provides service to its higher layer, a radio link control (RLC) layer via logical channels. The RLC layer at L2 supports reliable data transmission. RLC functionality may be implemented in a function block of the MAC layer. A packet data convergence protocol (PDCP) layer at L2 performs header compression to reduce the amount of unnecessary control information and thus efficiently transmit Internet protocol (IP) packets such as IP version 4 (IPv4) or IP version 6 (IPv6) packets via an air interface having a narrow bandwidth.

A radio resource control (RRC) layer at the lowest part of layer 3 (or L3) is defined only on the control plane. The RRC layer controls logical channels, transport channels, and physical channels in relation to configuration, reconfiguration, and release of radio bearers. A radio bearer refers to a service provided at L2, for data transmission between the UE and the E-UTRAN. For this purpose, the RRC layers of the UE and the E-UTRAN exchange RRC messages with each other. If an RRC connection is established between the UE and the E-UTRAN, the UE is in RRC Connected mode and otherwise, the UE is in RRC Idle mode. A Non-Access Stratum (NAS) layer above the RRC layer performs functions including session management and mobility management.

DL transport channels used to deliver data from the E-UTRAN to UEs include a broadcast channel (BCH) carrying system information, a paging channel (PCH) carrying a paging message, and a shared channel (SCH) carrying user traffic or a control message. DL multicast traffic or control messages or DL broadcast traffic or control messages may be transmitted on a DL SCH or a separately defined DL multicast channel (MCH). UL transport channels used to deliver data from a UE to the E-UTRAN include a random access channel (RACH) carrying an initial control message and a UL SCH carrying user traffic or a control message. Logical channels that are defined above transport channels and mapped to the transport channels include a broadcast control channel (BCCH), a paging control channel (PCCH), a Common Control Channel (CCCH), a multicast control channel (MCCH), a multicast traffic channel (MTCH), etc.

Figure 2:
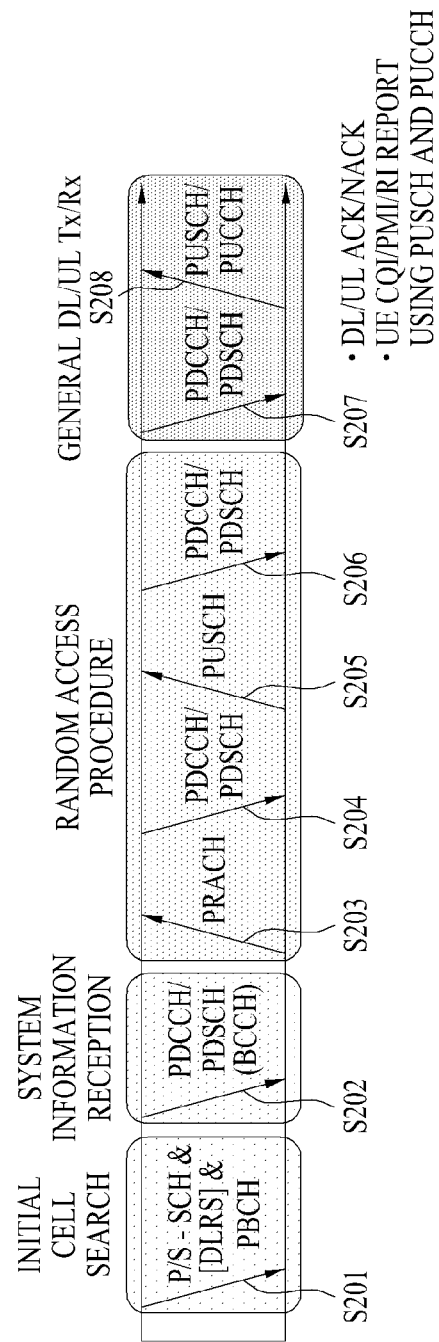
FIG. 2 is a diagram illustrating physical channels and a general signal transmission method using the physical channels in a 3GPP system.

FIG. 2 illustrates physical channels and a general method for transmitting signals on the physical channels in the 3GPP system.

When a UE is powered on or enters a new cell, the UE performs initial cell search (S201). The initial cell search involves acquisition of synchronization to an eNB. Specifically, the UE synchronizes its timing to the eNB and acquires a cell identifier (ID) and other information by receiving a primary synchronization channel (P-SCH) and a secondary synchronization channel (S-SCH) from the eNB. Then the UE may acquire information broadcast in the cell by receiving a physical broadcast channel (PBCH) from the eNB. During the initial cell search, the UE may monitor a DL channel state by receiving a downlink reference signal (DL RS).

After the initial cell search, the UE may acquire detailed system information by receiving a physical downlink control channel (PDCCH) and receiving a physical downlink shared channel (PDSCH) based on information included in the PDCCH (S202).

If the UE initially accesses the eNB or has no radio resources for signal transmission to the eNB, the UE may perform a random access procedure with the eNB (S203 to S206). In the random access procedure, the UE may transmit a predetermined sequence as a preamble on a physical random access channel (PRACH) (S203 and S205) and may receive a response message to the preamble on a PDCCH and a PDSCH associated with the PDCCH (S204 and S206). In the case of a contention-based RACH, the UE may additionally perform a contention resolution procedure.

After the above procedure, the UE may receive a PDCCH and/or a PDSCH from the eNB (S207) and transmit a physical uplink shared channel (PUSCH) and/or a physical uplink control channel (PUCCH) to the eNB (S208), which is a general DL and UL signal transmission procedure. Particularly, the UE receives downlink control information (DCI) on a PDCCH. Herein, the DCI includes control information such as resource allocation information for the UE. Different DCI formats are defined according to different usages of DCI.

Control information that the UE transmits to the eNB on the UL or receives from the eNB on the DL includes a DL/UL acknowledgment/negative acknowledgment (ACK/NACK) signal, a channel quality indicator (CQI), a precoding matrix index (PMI), a rank indicator (RI), etc. In the 3GPP LTE system, the UE may transmit control information such as a CQI, a PMI, an RI, etc. on a PUSCH and/or a PUCCH.

The use of an ultra-high frequency band, that is, a millimeter frequency band at or above 6 GHz is under consideration in the NR system to transmit data in a wide frequency band, while maintaining a high transmission rate for multiple users. The 3GPP calls this system NR. In the present disclosure, the system will also be referred to as an NR system The NR system uses an OFDM transmission scheme or a transmission scheme similar thereto. The NR system may conform to OFDM parameters different from OFDM parameters used in the LTE system. Alternatively, the NR system may conform to numerology of legacy LTE/LTE-A but include a broader system bandwidth (e.g., 100 MHz). Alternatively, one cell may support a plurality of numerologies. That is, UEs operating with different numerologies may coexist in one cell.

Figure 3:
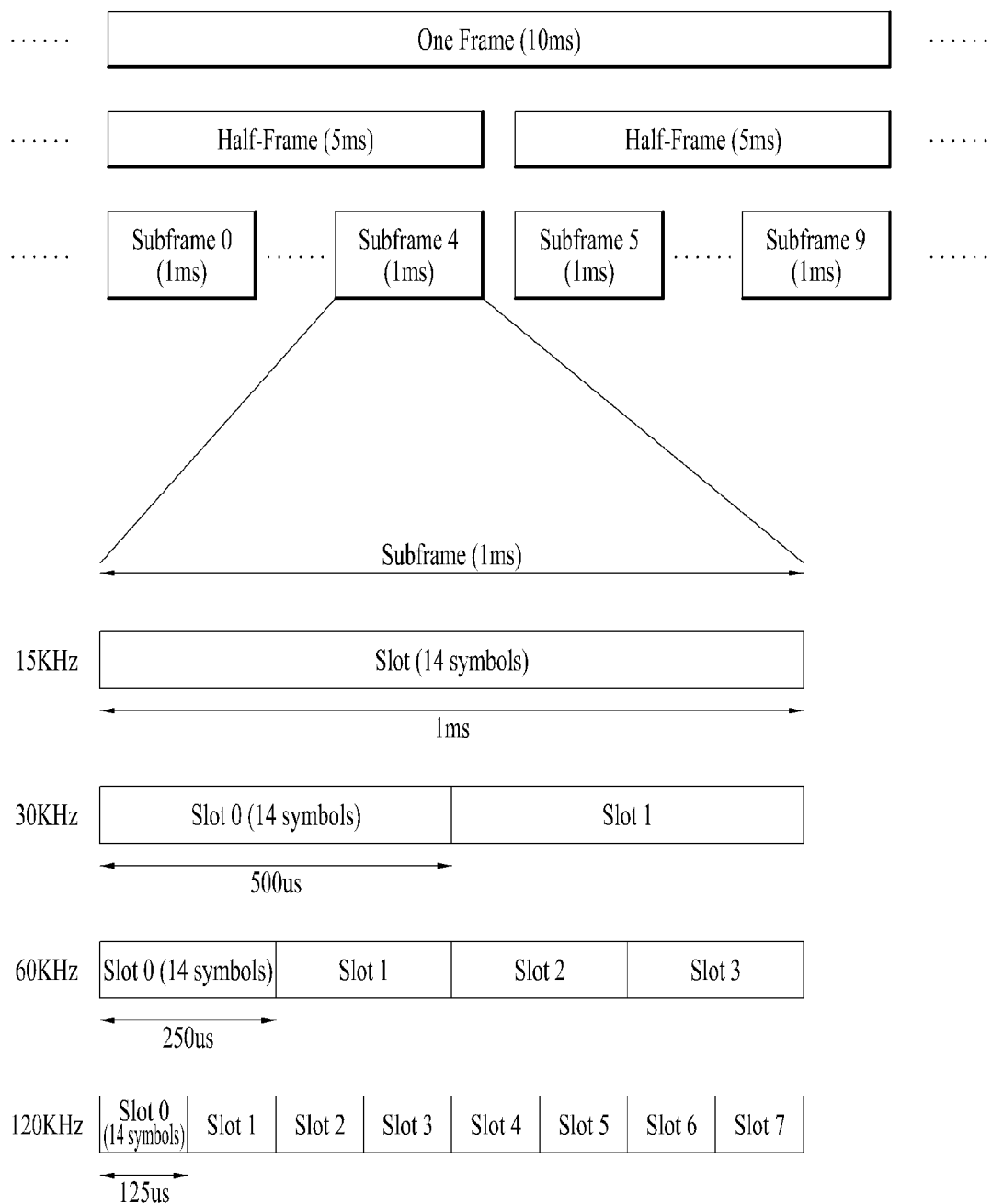
FIGS. 3, 4 and 5 are diagrams illustrating structures of a radio frame and slots used in a new RAT (NR) system.

FIG. 3 illustrates a structure of a radio frame used in NR.

In NR, UL and DL transmissions are configured in frames. The radio frame has a length of 10 ms and is defined as two 5-ms half-frames (HF). The half-frame is defined as five 1 ms subframes (SF). A subframe is divided into one or more slots, and the number of slots in a subframe depends on subcarrier spacing (SCS). Each slot includes 12 or 14 OFDM(A) symbols according to a cyclic prefix (CP). When a normal CP is used, each slot includes 14 symbols. When an extended CP is used, each slot includes 12 symbols. Here, the symbols may include OFDM symbols (or CP-OFDM symbols) and SC-FDMA symbols (or DFT-s-OFDM symbols).

[Table 1] illustrates that the number of symbols per slot, the number of slots per frame, and the number of slots per subframe vary according to the SCS when the normal CP is used.

TABLE 1

| SCS (15*2^u) | $N^{slot}_{symb}$ | $N^{frame,u}_{slot}$ | $N^{subframe,u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

*$N^{slot}_{symb}$: Number of symbols in a slot
*$N^{frame,u}_{slot}$: Number of slots in a frame
*$N^{subframe,u}_{slot}$: Number of slots in a subframe

[Table 2] illustrates that the number of symbols per slot, the number of slots per frame, and the number of slots per subframe vary according to the SCS when the extended CP is used.

TABLE 2

| SCS (15*2^u) | $N^{slot}_{symb}$ | $N^{frame,u}_{slot}$ | $N^{subframe,u}_{slot}$ |
|---|---|---|---|
| 60 KHz (u = 2) | 12 | 40 | 4 |

In the NR system, the OFDM(A) numerology (e.g., SCS, CP length, etc.) may be configured differently among a plurality of cells merged for one UE. Thus, the (absolute time) duration of a time resource (e.g., SF, slot or TTI) (referred to as a time unit (TU) for simplicity) composed of the same number of symbols may be set differently among the merged cells.

Figure 4:
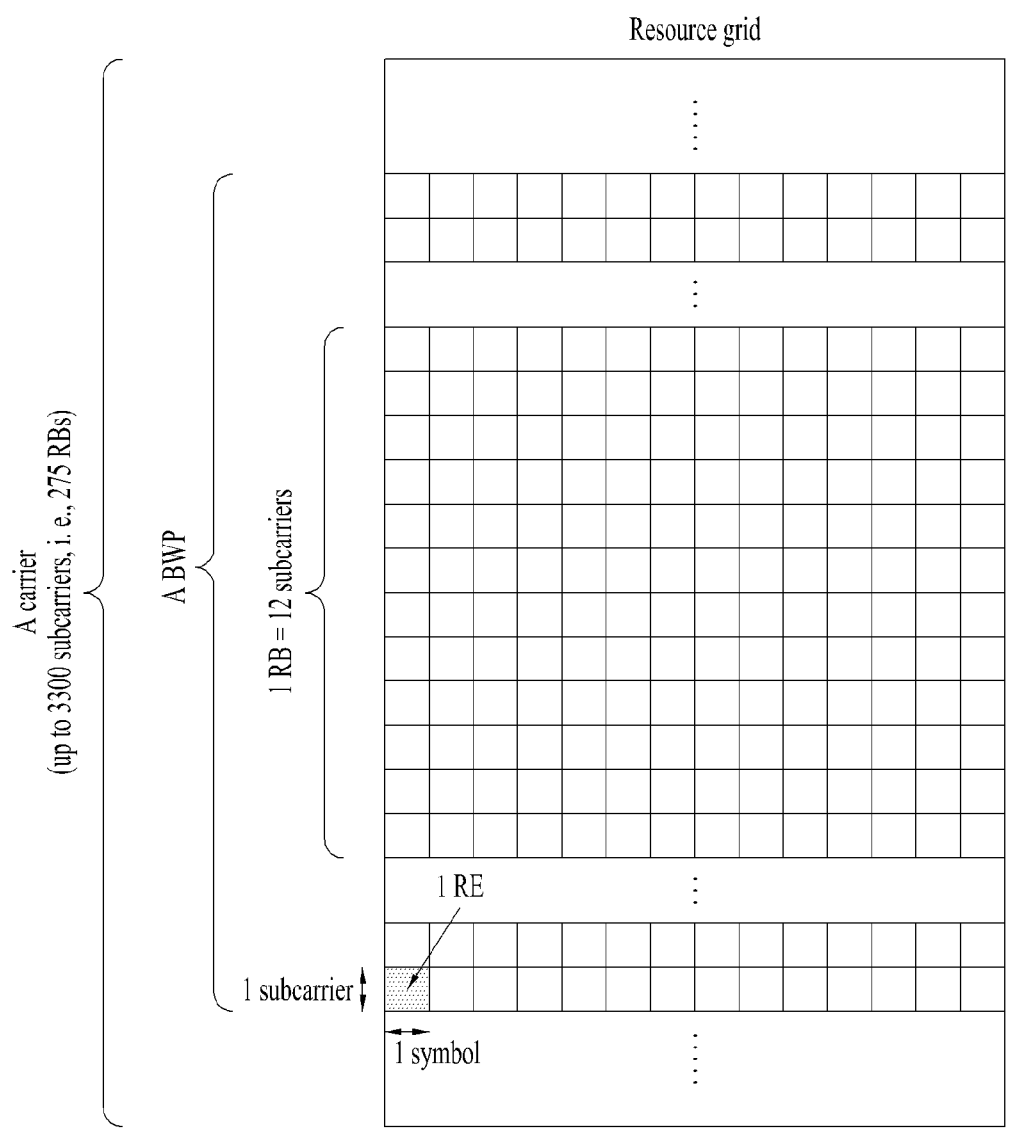

FIG. 4 illustrates a slot structure of an NR frame. A slot includes a plurality of symbols in the time domain. For example, in the case of the normal CP, one slot includes seven symbols. On the other hand, in the case of the extended CP, one slot includes six symbols. A carrier includes a plurality of subcarriers in the frequency domain. A resource block (RB) is defined as a plurality of consecutive subcarriers (e.g., 12 consecutive subcarriers) in the frequency domain. A bandwidth part (BWP) is defined as a plurality of consecutive (P)RBs in the frequency domain and may correspond to one numerology (e.g., SCS, CP length, etc.). A carrier may include up to N (e.g., five) BWPs. Data communication is performed through an activated BWP, and only one BWP may be activated for one UE. In the resource grid, each element is referred to as a resource element (RE), and one complex symbol may be mapped thereto.

Figure 5:
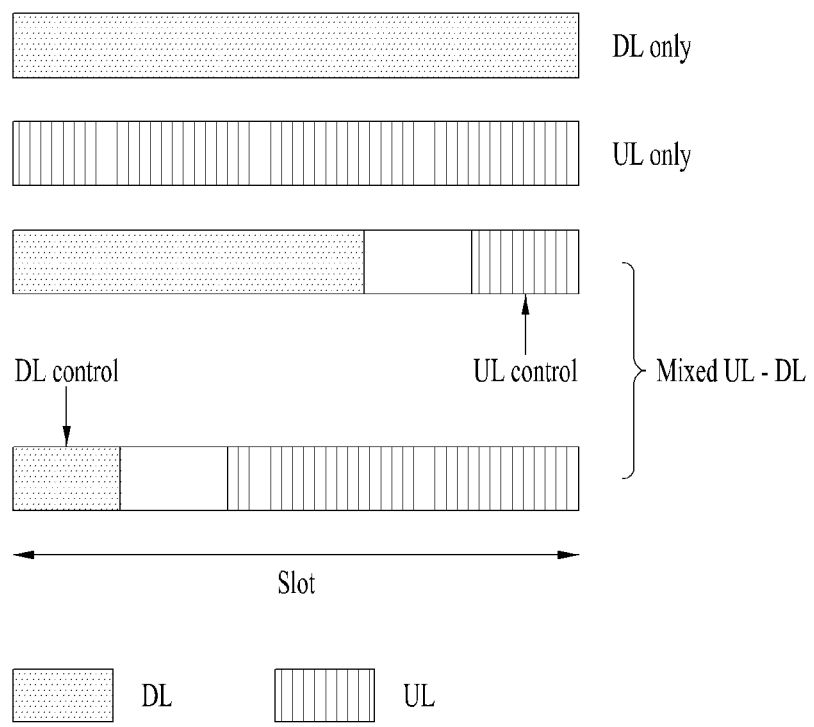

FIG. 5 illustrates a structure of a self-contained slot. In the NR system, a frame has a self-contained structure in which a DL control channel, DL or UL data, a UL control channel, and the like may all be contained in one slot. For example, the first N symbols (hereinafter, DL control region) in the slot may be used to transmit a DL control channel, and the last M symbols (hereinafter, UL control region) in the slot may be used to transmit a UL control channel. N and M are integers greater than or equal to 0. A resource region (hereinafter, a data region) that is between the DL control region and the UL control region may be used for DL data transmission or UL data transmission. For example, the following configuration may be considered. Respective sections are listed in a temporal order.

1. DL only configuration
2. UL only configuration
3. Mixed UL-DL configuration
   DL region+Guard period (GP)+UL control region
   DL control region+GP+UL region
   DL region: (i) DL data region, (ii) DL control region+DL data region
   UL region: (i) UL data region, (ii) UL data region+UL control region The PDCCH may be transmitted in the DL control region, and the PDSCH may be transmitted in the DL data region. The PUCCH may be transmitted in the UL control region, and the PUSCH may be transmitted in the UL data region. Downlink control information (DCI), for example, DL data scheduling information, UL data scheduling information, and the like, may be transmitted on the PDCCH. Uplink control information (UCI), for example, ACK/NACK information about DL data, channel state information (CSI), and a scheduling request (SR), may be transmitted on the PUCCH. The GP provides a time gap in the process of the UE switching from the transmission mode to the reception mode or from the reception mode to the transmission mode. Some symbols at the time of switching from DL to UL within a subframe may be configured as the GP.

Positioning Reference Signal (PRS) in LTE System

Positioning may refer to determining the geographical position and/or velocity of the UE based on measurement of radio signals. Location information may be requested by and reported to a client (e.g., an application) associated with the UE. The location information may also be requested by a client within or connected to a core network. The location information may be reported in standard formats such as cell-based or geographical coordinates, together with estimated errors of the position and velocity of the UE and/or a positioning method used for positioning.

For such positioning, a positioning reference signal (PRS) may be used. The PRS is a reference signal used to estimate the position of the UE. For example, in the LTE system, the PRS may be transmitted only in a DL subframe configured for PRS transmission (hereinafter, "positioning subframe"). If both a multimedia broadcast single frequency network (MBSFN) subframe and a non-MBSFN subframe are configured as positioning subframes, OFDM symbols of the MBSFN subframe should have the same cyclic prefix (CP) as symbols of subframe #0. If only the MBSFN subframe is configured as the positioning subframe within a cell, OFDM symbols configured for the PRS in the MBSFN subframe may have an extended CP.

The sequence of the PRS may be defined by [Equation 1] below.

$$r_{l,n_s}(m) = \frac{1}{\sqrt{2}}(1 - 2 \cdot c(2m)) + j\frac{1}{\sqrt{2}}(1 - 2 \cdot c(2m + 1)),$$
$$m = 0, 1, \ldots, 2N_{RB}^{max,DL} - 1$$
[Equation 1]

where $n_s$ denotes a slot number in a radio frame and 1 denotes an OFDM symbol number in a slot. $N_{RB}^{max,DL}$ is represented as an integer multiple of $N_{SC}^{RB}$ as the largest value among DL bandwidth configurations. $N_{SC}^{RB}$ denotes the size of a resource block (RB) in the frequency domain, for example, 12 subcarriers.

c(i) denotes a pseudo-random sequence and may be initialized by [Equation 2] below.

$$c_{init}=2^{28} \cdot \lfloor N_{ID}^{PRS}/512 \rfloor + 2^{10} \cdot (7 \cdot (n_s+1)+l+1) \cdot (2 \cdot (N_{ID}^{PRS} \bmod 512)+1)+2 \cdot (N_{ID}^{PRS} \bmod 512)+N_{CP}$$
[Equation 2]

Unless additionally configured by higher layers, $N_{ID}^{PRS}$ is equal to $N_{ID}^{cell}$, and $N_{CP}$ is 1 for a normal CP and 0 for an extended CP.

Figure 6:
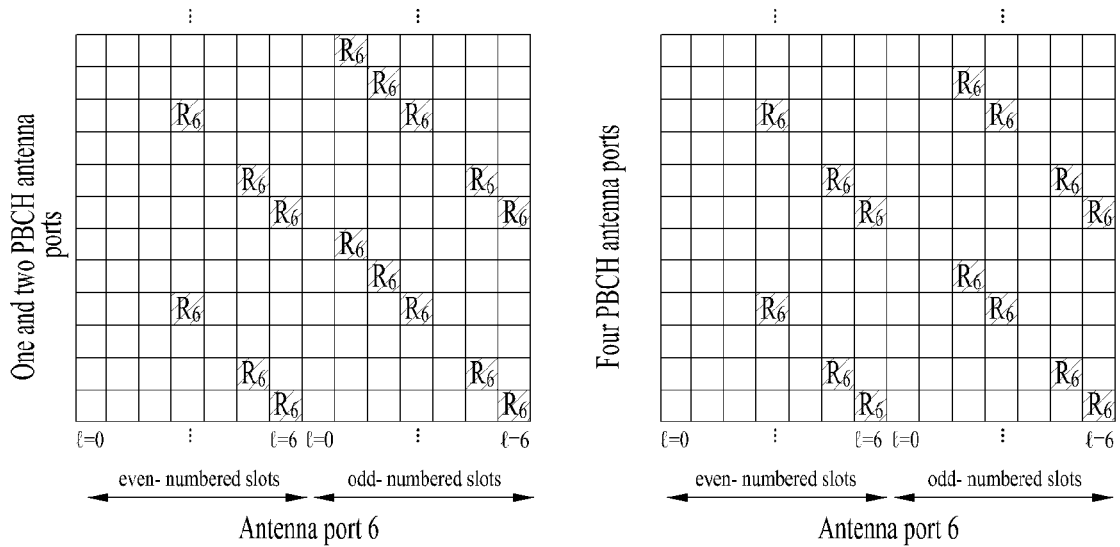
FIG. 6 illustrates an exemplary pattern to which a positioning reference signal (PRS) is mapped in a subframe.
Figure 6:
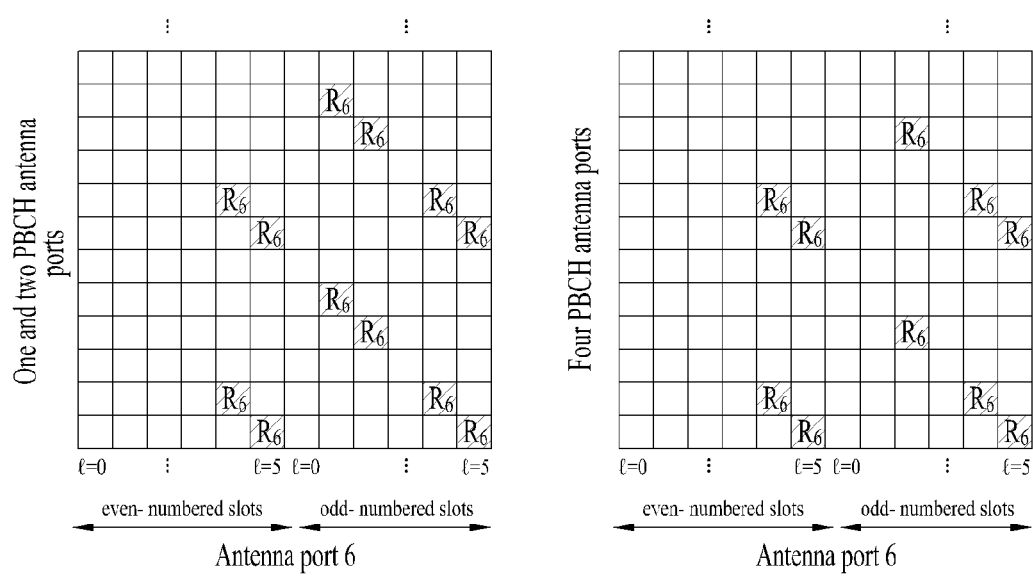

FIG. 6 illustrates an exemplary pattern to which a PRS is mapped in a subframe. As illustrated in FIG. 6, the PRS may be transmitted through an antenna port 6. FIG. 6(a) illustrates mapping of the PRS in the normal CP and FIG. 6(b) illustrates mapping of the PRS in the extended CP.

The PRS may be transmitted in consecutive subframes grouped for positioning. The subframes grouped for positioning are referred to as a positioning occasion. The positioning occasion may consist of 1, 2, 4 or 6 subframes. The positioning occasion may occur periodically at a periodicity of 160, 320, 640 or 1280 subframes. A cell-specific subframe offset value may be defined to indicate the starting subframe of PRS transmission. The offset value and the periodicity of the positioning occasion for PRS transmission may be derived from PRS configuration indexes as listed in [Table 3] below.

TABLE 3

| PRS configuration Index ($I_{PRS}$) | PRS periodicity (subframes) | PRS subframe offset (subframes) |
|---|---|---|
| 0-159 | 160 | $I_{PRS}$ |
| 160-479 | 320 | $I_{PRS}$-160 |
| 480-1119 | 640 | $I_{PRS}$-480 |
| 1120-2399 | 1280 | $I_{PRS}$-1120 |
| 2400-2404 | 5 | $I_{PRS}$-2400 |
| 2405-2414 | 10 | $I_{PRS}$-2405 |
| 2415-2434 | 20 | $I_{PRS}$-2415 |
| 2435-2474 | 40 | $I_{PRS}$-2435 |
| 2475-2554 | 80 | $I_{PRS}$-2475 |
| 2555-4095 | Reserved | |

A PRS included in each positioning occasion is transmitted with constant power. A PRS in a certain positioning occasion may be transmitted with zero power, which is referred to as PRS muting. For example, when a PRS transmitted by a serving cell is muted, the UE may easily detect a PRS of a neighbor cell.

The PRS muting configuration of a cell may be defined by a periodic muting sequence consisting of 2, 4, 8 or 16 positioning occasions. That is, the periodic muting sequence may include 2, 4, 8, or 16 bits according to a positioning occasion corresponding to the PRS muting configuration and each bit may have a value "0" or "1". For example, PRS muting may be performed in a positioning occasion with a bit value of "0".

The positioning subframe is designed to have a low-interference subframe so that no data is transmitted in the positioning subframe. Therefore, the PRS is not subjected to interference due to data transmission although the PRS may interfere with PRSs of other cells.

UE Positioning Architecture in LTE System

Figure 7:
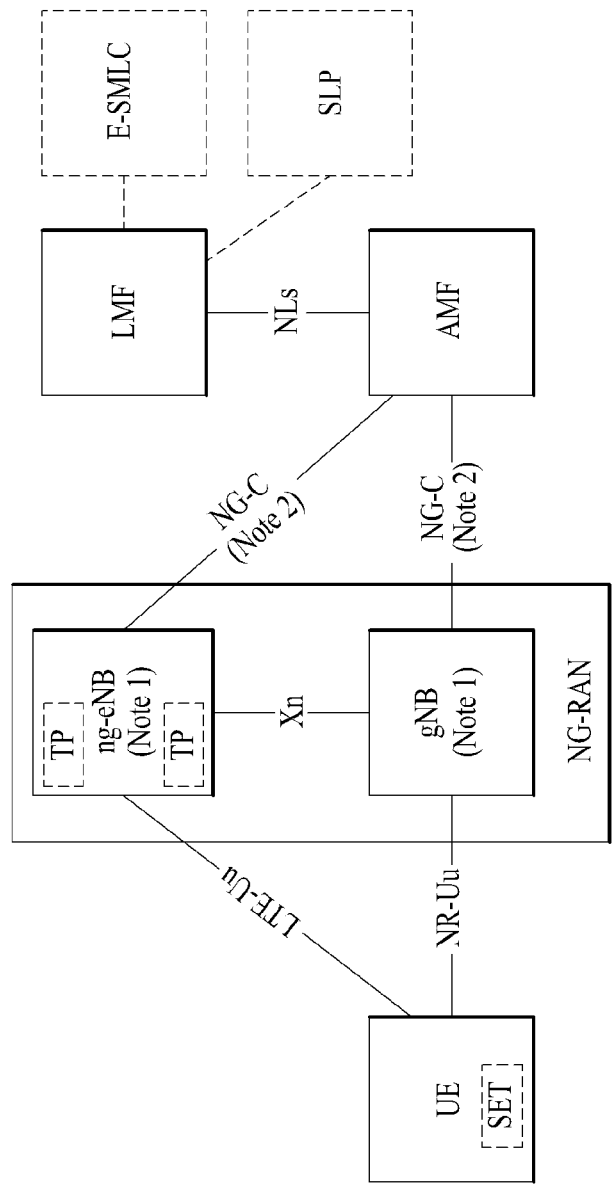
FIGS. 7 and 8 are diagrams illustrating the architecture of a system for measuring the position of a UE and a procedure of measuring the position of the UE.

FIG. 7 illustrates the architecture of a 5G system applicable to positioning of a UE connected to a next generation-radio access network (NG-RAN) or an E-UTRAN.

Referring to FIG. 7, a core access and mobility management function (AMF) may receive a request for a location service associated with a particular target UE from another entity such as a gateway mobile location center (GMLC) or the AMF itself decides to initiate the location service on behalf of the particular target UE. Then, the AMF transmits a request for a location service to a location management function (LMF). Upon receiving the request for the location service, the LMF may process the request for the location service and then returns the processing result including the estimated position of the UE to the AMF. In the case of a location service requested by an entity such as the GMLC other than the AMF, the AMF may transmit the processing result received from the LMF to this entity.

A new generation evolved-NB (ng-eNB) and a gNB are network elements of the NG-RAN capable of providing a measurement result for positioning. The ng-eNB and the gNB may measure radio signals for a target UE and transmits a measurement result value to the LMF. The ng-eNB may control several transmission points (TPs), such as remote radio heads, or PRS-only TPs for support of a PRS-based beacon system for E-UTRA.

The LMF is connected to an enhanced serving mobile location center (E-SMLC) which may enable the LMF to access the E-UTRAN. For example, the E-SMLC may enable the LMF to support an observed time difference of arrival (OTDOA), which is one of positioning methods of the E-UTRAN, using DL measurement obtained by a target UE through signals transmitted by eNBs and/or PRS-only TPs in the E-UTRAN.

The LMF may be connected to an SUPL location platform (SLP). The LMF may support and manage different location services for target UEs. The LMF may interact with a serving ng-eNB or a serving gNB for a target UE in order to obtain positioning for the UE. For positioning of the target UE, the LMF may determine positioning methods, based on a location service (LCS) client type, required quality of service (QoS), UE positioning capabilities, gNB positioning capabilities, and ng-eNB positioning capabilities, and then apply these positioning methods to the serving gNB and/or serving ng-eNB. The LMF may determine additional information such as accuracy of the location estimate and velocity of the target UE. The SLP is a secure user plane location (SUPL) entity responsible for positioning over a user plane.

The UE may measure the position thereof using DL RSs transmitted by the NG-RAN and the E-UTRAN. The DL RSs transmitted by the NG-RAN and the E-UTRAN to the UE may include a SS/PBCH block, a CSI-RS, and/or a PRS. Which DL RS is used to measure the position of the UE may conform to configuration of LMF/E-SMLC/ng-eNB/E-UTRAN etc. The position of the UE may be measured by an RAT-independent scheme using different global navigation satellite systems (GNSSs), terrestrial beacon systems (TBSs), WLAN access points, Bluetooth beacons, and sensors (e.g., barometric sensors) installed in the UE. The UE may also contain LCS applications or access an LCS application through communication with a network accessed thereby or through another application contained therein. The LCS application may include measurement and calculation functions needed to determine the position of the UE. For example, the UE may contain an independent positioning function such as a global positioning system (GPS) and report the position thereof, independent of NG-RAN transmission. Such independently obtained positioning information may be used as assistance information of positioning information obtained from the network.

Operation for UE Positioning

Figure 8:
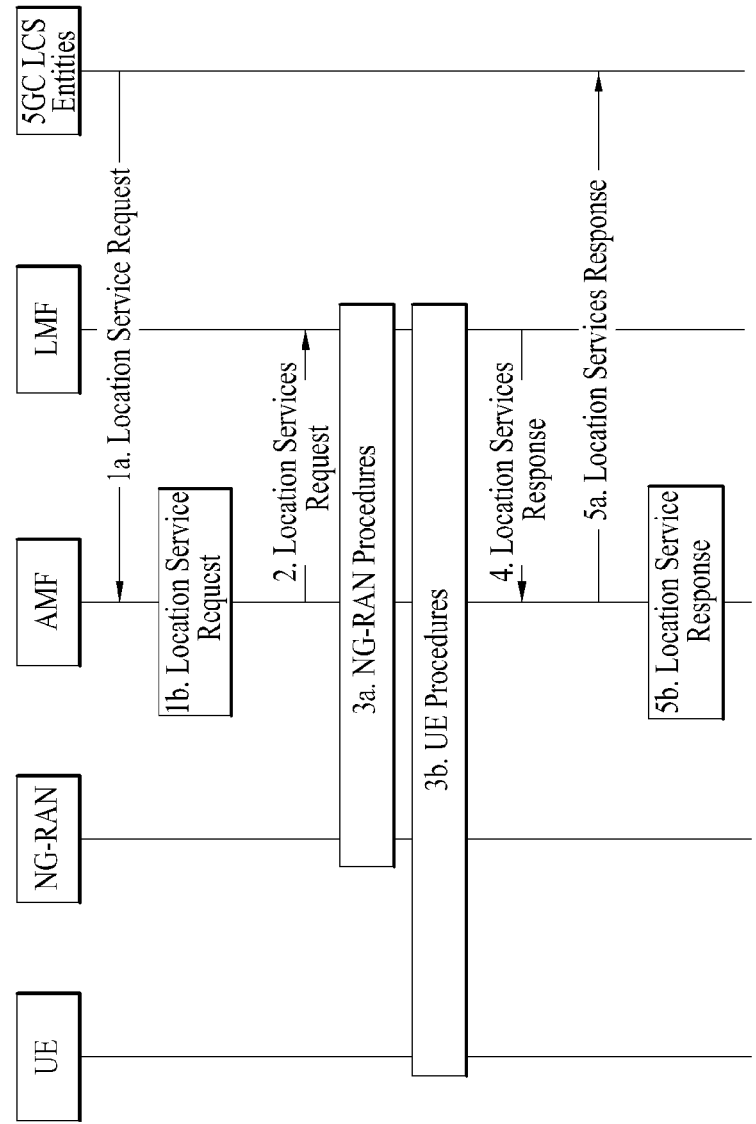

FIG. 8 illustrates an implementation example of a network for UE positioning. When an AMF receives a request for a location service in the case in which the UE is in connection management (CM)-IDLE state, the AMF may make a request for a network triggered service in order to establish a signaling connection with the UE and to assign a specific serving gNB or ng-eNB. This operation procedure is omitted in FIG. 8. In other words, in FIG. 8, it may be assumed that the UE is in a connected mode. However, the signaling connection may be released by an NG-RAN as a result of signaling and data inactivity while a positioning procedure is still ongoing.

An operation procedure of the network for UE positioning will now be described in detail with reference to FIG. 8. In step 1a, a 5GC entity such as GMLC may transmit a request for a location service for measuring the position of a target UE to a serving AMF. Here, even when the GMLC does not make the request for the location service, the serving AMF may determine the need for the location service for measuring the position of the target UE according to step 1b. For example, the serving AMF may determine that itself will perform the location service in order to measure the position of the UE for an emergency call.

In step 2, the AMF transfers the request for the location service to an LMF. In step 3a, the LMF may initiate location procedures with a serving ng-eNB or a serving gNB to obtain location measurement data or location measurement assistance data. For example, the LMF may transmit a request for location related information associated with one or more UEs to the NG-RAN and indicate the type of necessary location information and associated QoS. Then, the NG-RAN may transfer the location related information to the LMF in response to the request. In this case, when a location determination method according to the request is an enhanced cell ID (E-CID) scheme, the NG-RAN may transfer additional location related information to the LMF in one or more NR positioning protocol A (NRPPa) messages. Here, the "location related information" may mean all values used for location calculation such as actual location estimate information and radio measurement or location measurement. Protocol used in step 3a may be an NRPPa protocol which will be described later.

Additionally, in step 3b, the LMF may initiate a location procedure for DL positioning together with the UE. For example, the LMF may transmit the location assistance data to the UE or obtain a location estimate or location measurement value. For example, in step 3b, a capability information transfer procedure may be performed. Specifically, the LMF may transmit a request for capability information to the UE and the UE may transmit the capability information to the LMF. Here, the capability information may include information about a positioning method supportable by the LFM or the UE, information about various aspects of a particular positioning method, such as various types of assistance data for an A-GNSS, and information about common features not specific to any one positioning method, such as ability to handle multiple LPP transactions. In some cases, the UE may provide the capability information to the LMF although the LMF does not transmit a request for the capability information.

As another example, in step 3b, a location assistance data transfer procedure may be performed. Specifically, the UE may transmit a request for the location assistance data to the LMF and indicate particular location assistance data needed to the LMF. Then, the LMF may transfer corresponding location assistance data to the UE and transfer additional assistance data to the UE in one or more additional LTE positioning protocol (LPP) messages. The location assistance data delivered from the LMF to the UE may be transmitted in a unicast manner In some cases, the LMF may transfer the location assistance data and/or the additional assistance data to the UE without receiving a request for the assistance data from the UE.

As another example, in step 3*b*, a location information transfer procedure may be performed. Specifically, the LMF may send a request for the location (related) information associated with the UE to the UE and indicate the type of necessary location information and associated QoS. In response to the request, the UE may transfer the location related information to the LMF. Additionally, the UE may transfer additional location related information to the LMF in one or more LPP messages. Here, the "location related information" may mean all values used for location calculation such as actual location estimate information and radio measurement or location measurement. Typically, the location related information may be a reference signal time difference (RSTD) value measured by the UE based on DL RSs transmitted to the UE by a plurality of NG-RANs and/or E-UTRANs. Similarly to the above description, the UE may transfer the location related information to the LMF without receiving a request from the LMF.

The procedures implemented in step 3*b* may be performed independently but may be performed consecutively. Generally, although step 3*b* is performed in order of the capability information transfer procedure, the location assistance data transfer procedure, and the location information transfer procedure, step 3*b* is not limited to such order. In other words, step 3*b* is not required to occur in specific order in order to improve flexibility in positioning. For example, the UE may request the location assistance data at any time in order to perform a previous request for location measurement made by the LMF. The LMF may also request location information, such as a location measurement value or a location estimate value, at any time, in the case in which location information transmitted by the UE does not satisfy required QoS. Similarly, when the UE does not perform measurement for location estimation, the UE may transmit the capability information to the LMF at any time.

In step 3*b*, when information or requests exchanged between the LMF and the UE are erroneous, an error message may be transmitted and received and an abort message for aborting positioning may be transmitted and received.

Protocol used in step 3*b* may be an LPP protocol which will be described later.

Step 3*b* may be performed additionally after step 3*a* but may be performed instead of step 3*a*.

In step 4, the LMF may provide a location service response to the AMF. The location service response may include information as to whether UE positioning is successful and include a location estimate value of the UE. If the procedure of FIG. 8 has been initiated by step 1*a*, the AMF may transfer the location service response to a 5GC entity such as a GMLC. If the procedure of FIG. 8 has been initiated by step 1*b*, the AMF may use the location service response in order to provide a location service related to an emergency call.

Protocol for Location Measurement (1) LTE Positioning Protocol (LPP)

Figure 9:
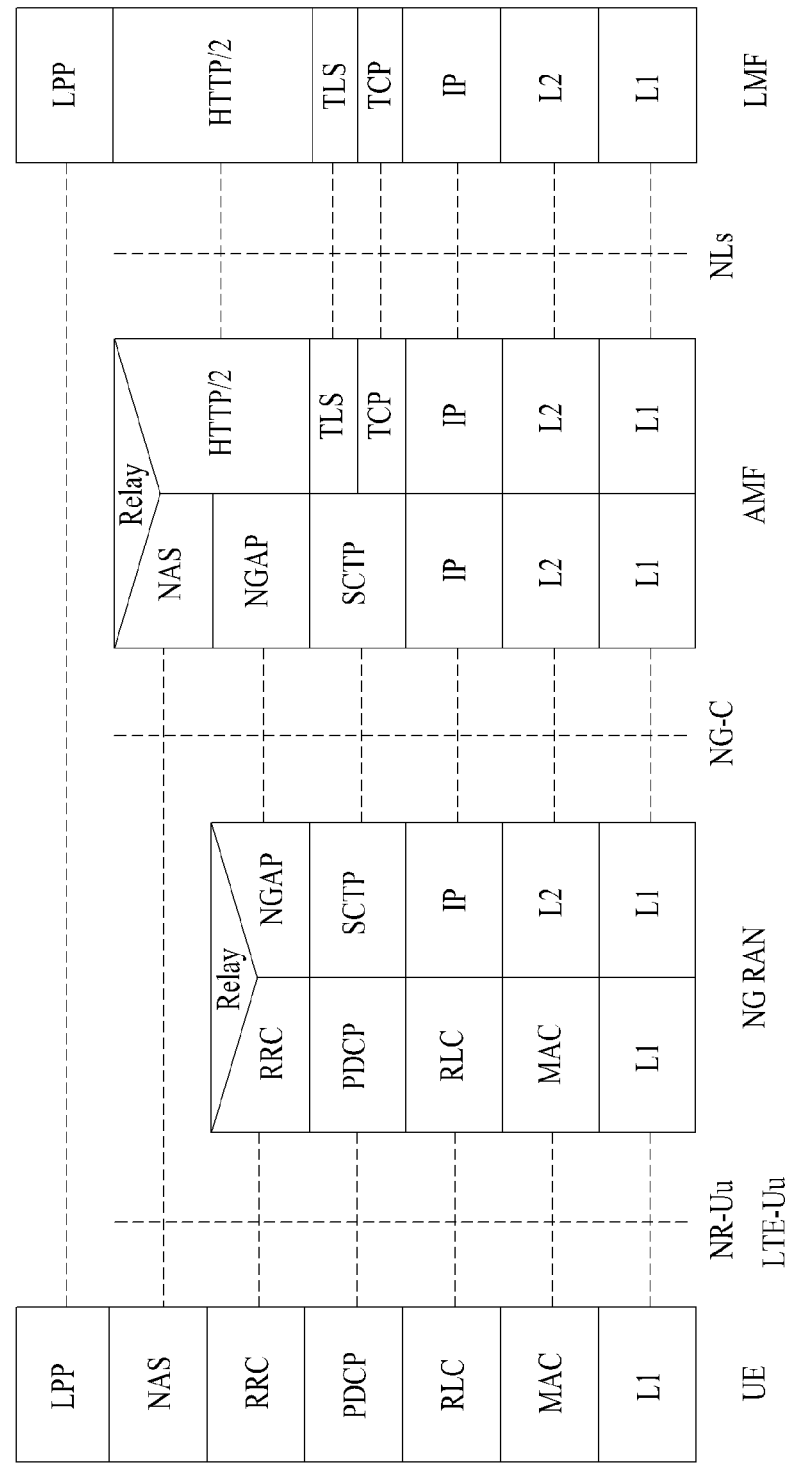
FIG. 9 illustrates an exemplary protocol layer used to support LTE positioning protocol (LPP) message transfer.

FIG. 9 illustrates an exemplary protocol layer used to support LPP message transfer between an LMF and a UE. An LPP protocol data unit (PDU) may be carried in a NAS PDU between an MAF and the UE. Referring to FIG. 9, LPP is terminated between a target device (e.g., a UE in a control plane or an SUPL enabled terminal (SET) in a user plane) and a location server (e.g., an LMF in the control plane or an SLP in the user plane). LPP messages may be carried as transparent PDUs cross intermediate network interfaces using appropriate protocols, such an NGAP over an NG-C interface and NAS/RRC over LTE-Uu and NR-Uu interfaces. LPP is intended to enable positioning for NR and LTE using various positioning methods.

For example, a target device and a location server may exchange, through LPP, capability information therebetween, assistance data for positioning, and/or location information. The target device and the location server may exchange error information and/or indicate stopping of an LPP procedure, through an LPP message.

(2) NR Positioning Protocol A (NRPPa)

Figure 10:
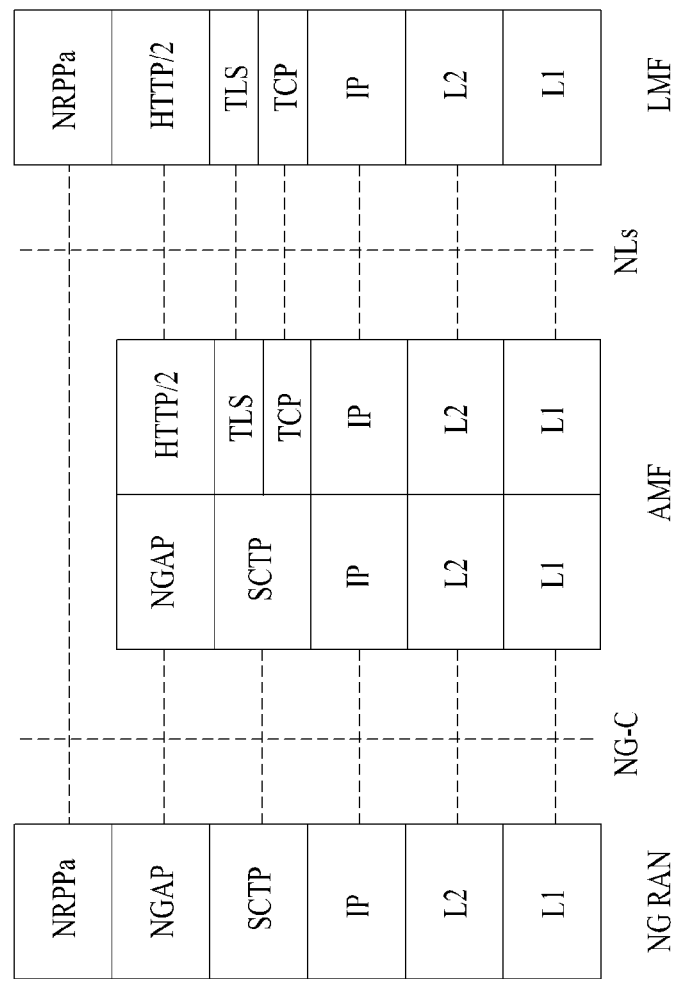
FIG. 10 is a diagram illustrating an exemplary protocol layer used to support NR positioning protocol A (NRPPa) protocol data unit (PDU) transfer.

FIG. 10 illustrates an exemplary protocol layer used to support NRPPa PDU transfer between an LMF and an NG-RAN node. NRPPa may be used to carry information between an NG-RAN node and an LMF. Specifically, NRPPa may exchange an E-CID for measurement transferred from an ng-eNB to an LMF, data for support of an OTDOA positioning method, and a cell-ID and a cell position ID for an NR cell ID positioning method. An AMF may route NRPPa PDUs based on a routing ID of an involved LMF over an NG-C interface without information about related NRPPa transaction.

An NRPPa procedure for location and data collection may be divided into two types. The first type is a UE associated procedure for transmitting information about a particular UE (e.g., location measurement information) and the second type is a non-UE-associated procedure for transmitting information applicable to an NG-RAN node and associated TPs (e.g., timing information of the gNB/ng-eNG/TP). The two types may be supported independently or simultaneously.

Positioning Measurement Method

Positioning methods supported in the NG-RAN may include a GNSS, an OTDOA, an E-CID, barometric sensor positioning, WLAN positioning, Bluetooth positioning, a TBS, uplink time difference of arrival (UTDOA) etc. Although any one of the positioning methods may be used for UE positioning, two or more positioning methods may be used for UE positioning.

(1) Observed Time Difference of Arrival (OTDOA)

Figure 11:
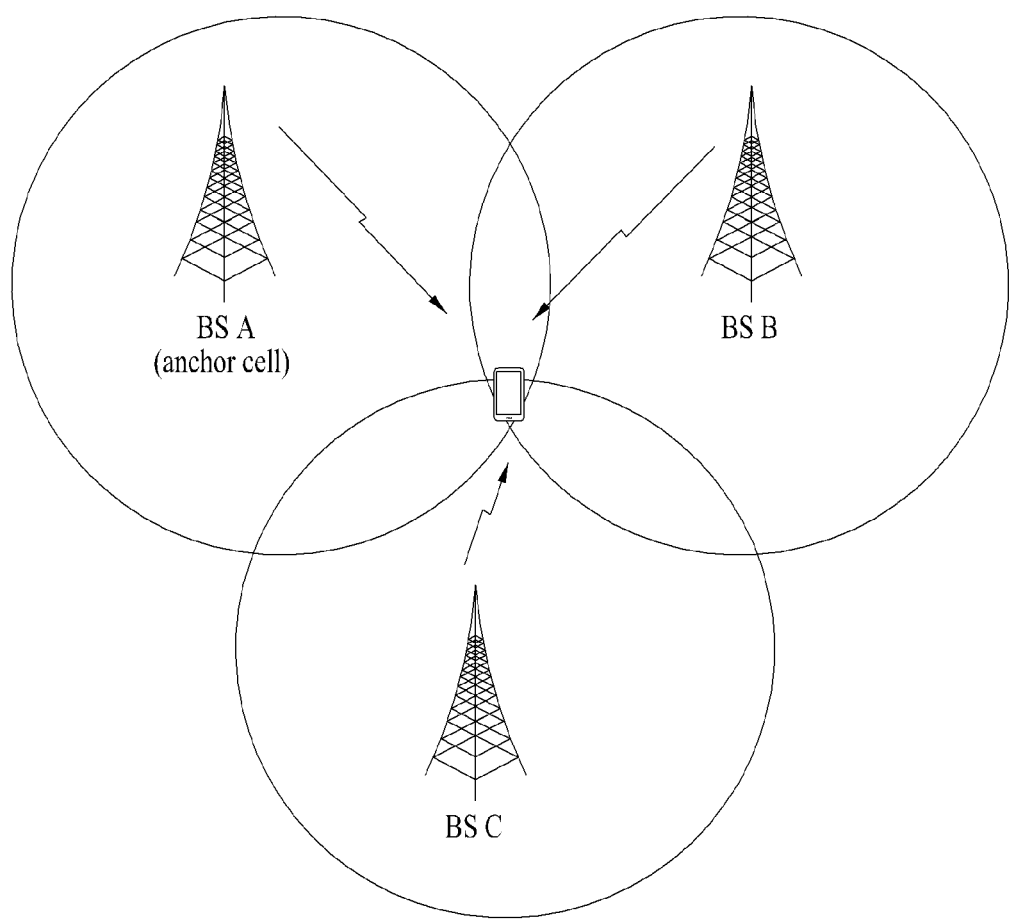
FIG. 11 is a diagram illustrating an embodiment of an observed time difference of arrival (OTDOA) positioning method.

FIG. 11 is a diagram illustrating an OTDOA positioning method. The OTDOA positioning method uses time measured for DL signals received from multiple TPs including an eNB, an ng-eNB, and a PRS-only TP by the UE. The UE measures time of received DL signals using location assistance data received from a location server. The position of the UE may be determined based on such a measurement result and geographical coordinates of neighboring TPs.

The UE connected to the gNB may request measurement gaps to perform OTDOA measurement from a TP. If the UE is not aware of an SFN of at least one TP in OTDOA assistance data, the UE may use autonomous gaps to obtain an SFN of an OTDOA reference cell prior to requesting measurement gaps for performing reference signal time difference (RSTD) measurement.

Here, the RSTD may be defined as the smallest relative time difference between two subframe boundaries received from a reference cell and a measurement cell. That is, the RSTD may be calculated as the relative time difference between the start time of a subframe received from the measurement cell and the start time of a subframe from the reference cell that is closest to the subframe received from the measurement cell. The reference cell may be selected by the UE.

For accurate OTDOA measurement, it is necessary to measure times of arrival (ToAs) of signals received from geographically distributed three or more TPs or BSs. For example, ToAs for TP 1, TP 2, and TP 3 may be measured, and an RSTD for TP 1 and TP 2, an RSTD for TP 2 and TP 3, and an RSTD for TP 3 and TP 1 are calculated based on the three ToAs. A geometric hyperbola may be determined based on the calculated RSTD values and a point at which curves of the hyperbola cross may be estimated as the position of the UE. In this case, accuracy and/or uncertainty for each ToA measurement may occur and the estimated position of the UE may be known as a specific range according to measurement uncertainty.

For example, an RSTD for two TPs may be calculated based on [Equation 3] below.

$$RSTDi, 1 = \frac{\sqrt{(x_t - x_i)^2 + (y_t - y_i)^2}}{c} - \frac{\sqrt{(x_t - x_1)^2 + (y_t - y_1)^2}}{c} + (Ti - T1) + (ni - n1)$$ [Equation 3]

where c is the speed of light, $\{x_t, y_t\}$ are (unknown) coordinates of a target UE, $\{x_i, y_i\}$ are (known) coordinates of a TP, and $\{x_1, y_1\}$ are coordinates of a reference TP (or another TP). Here, $(T_i-T_1)$ is a transmission time offset between two TPs, referred to as "real time differences" (RTDs), and $n_i$ and $n_1$ are UE ToA measurement error values.

(2) Enhanced Cell ID (E-CID)

In a cell ID (CID) positioning method, the position of the UE may be measured based on geographical information of a serving ng-eNB, a serving gNB, and/or a serving cell of the UE. For example, the geographical information of the serving ng-eNB, the serving gNB, and/or the serving cell may be acquired by paging, registration, etc.

The E-CID positioning method may use additional UE measurement and/or NG-RAN radio resources in order to improve UE location estimation in addition to the CID positioning method. Although the E-CID positioning method partially may utilize the same measurement methods as a measurement control system on an RRC protocol, additional measurement only for UE location measurement is not generally performed. In other words, an additional measurement configuration or measurement control message may not be provided for UE location measurement. The UE does not expect that an additional measurement operation only for location measurement will be requested and the UE may report a measurement value obtained by generally measurable methods.

For example, the serving gNB may implement the E-CID positioning method using an E-UTRA measurement value provided by the UE.

Measurement elements usable for E-CID positioning may be, for example, as follows.

UE measurement: E-UTRA reference signal received power (RSRP), E-UTRA reference signal received quality (RSRQ), UE E-UTRA reception (RX)-transmission (TX) time difference, GERAN/WLAN reference signal strength indication (RSSI), UTRAN common pilot channel (CPICH) received signal code power (RSCP), and/or UTRAN CPICH Ec/Io E-UTRAN measurement: ng-eNB RX-TX time difference, timing advance ($T_{ADV}$), and/or AoA Here, $T_{ADV}$ may be divided into Type 1 and Type 2 as follows.

$T_{ADV}$ Type 1=(ng-eNB RX-TX time difference)+(UE E-UTRA RX-TX time difference)

$T_{ADV}$ Type 2=ng-eNB RX-TX time difference

AoA may be used to measure the direction of the UE. AoA is defined as the estimated angle of the UE counterclockwise from the eNB/TP. In this case, a geographical reference direction may be north. The eNB/TP may use a UL signal such as an SRS and/or a DMRS for AoA measurement. The accuracy of measurement of AoA increases as the arrangement of an antenna array increases. When antenna arrays are arranged at the same interval, signals received at adjacent antenna elements may have constant phase rotate.

(3) Uplink Time Difference of Arrival (UTDOA)

UTDOA is to determine the position of the UE by estimating the arrival time of an SRS. When an estimated SRS arrival time is calculated, a serving cell is used as a reference cell and the position of the UE may be estimated by the arrival time difference with another cell (or an eNB/TP). To implement UTDOA, an E-SMLC may indicate the serving cell of a target UE in order to indicate SRS transmission to the target UE. The E-SMLC may provide configurations such as periodic/non-periodic SRS, bandwidth, and frequency/group/sequence hopping.

Now, a hierarchical scheme capable of effectively estimating/measuring the position of a specific UE using an OTDOA and a signal transmission and reception method between a UE, a BS, and a location server, based on an embodiment of the present disclosure, will be described.

First, operation implementation examples of the UE, the BS, the location server, and a network according to an embodiment of the present disclosure will be described with reference to FIGS. 12 to 15.

Figure 12:
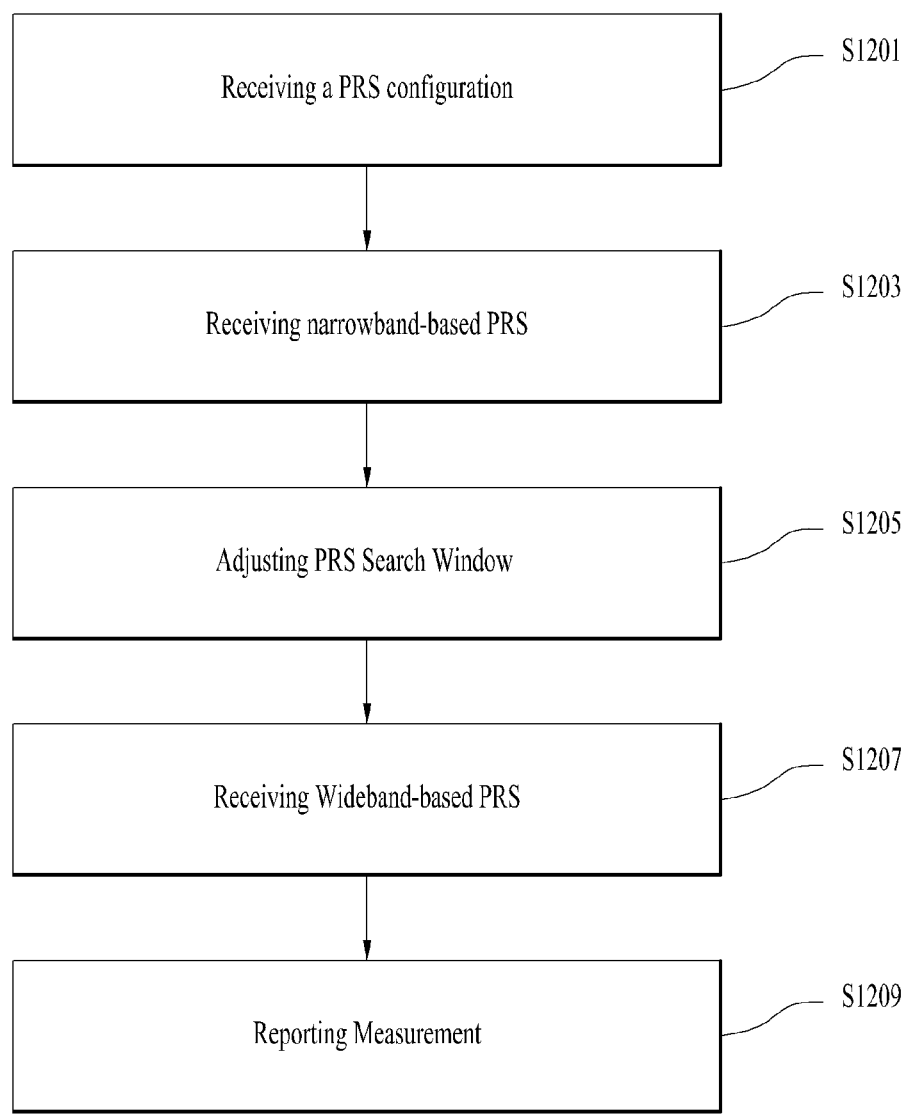
FIGS. 12 to 15 illustrate operation implementation example of a UE, a BS, and a location server according to an embodiment of the present disclosure.

FIG. 12 illustrates an operation implementation example of the UE according to an embodiment of the present disclosure. Referring to FIG. 12, the UE may receive a PRS configuration from the BS and/or the location server (S1201). In this case, an example of the PRS configuration that the UE receives may conform to steps #1 and #2 of Embodiment 1, steps #1 and #2 of Embodiment 2, step #1 of Embodiment 3, and Embodiment 5, Embodiment 6, and/or Embodiment 8.

The UE may receive a narrowband-based PRS from the BS (S1203). In this case, a specific embodiment for narrowband-based PRS reception may conform to step #2 of Embodiment 1 and/or step #2 of Embodiment 2.

The UE may adjust a PRS search window according to the PRS configuration based on the received narrowband-based PRS (S1205) and receive a wideband-based PRS within the adjusted PRS search window (S1207). In this case, a procedure for selecting a BS/TP according to Embodiment 4 may be added between steps S1203 and S1205 or between steps S1205 and S1207. In addition, steps S1205 and S1207 may be performed based on step #3 of Embodiment 1 and/or step #3 of Embodiment 2, specifically, based on steps #2 and #3 of Embodiment 3.

The UE may report a reference signal time difference (RSTD), a time of arrival (TOA), etc., which are finally measured based on the received narrowband-based PRS and/or wideband-based PRS, to the BS and/or the location server (S1209). A specific embodiment for this step may be based on step #4 of Embodiment 1, step #4 of Embodiment 2, and/or Embodiment 7.

Figure 13:
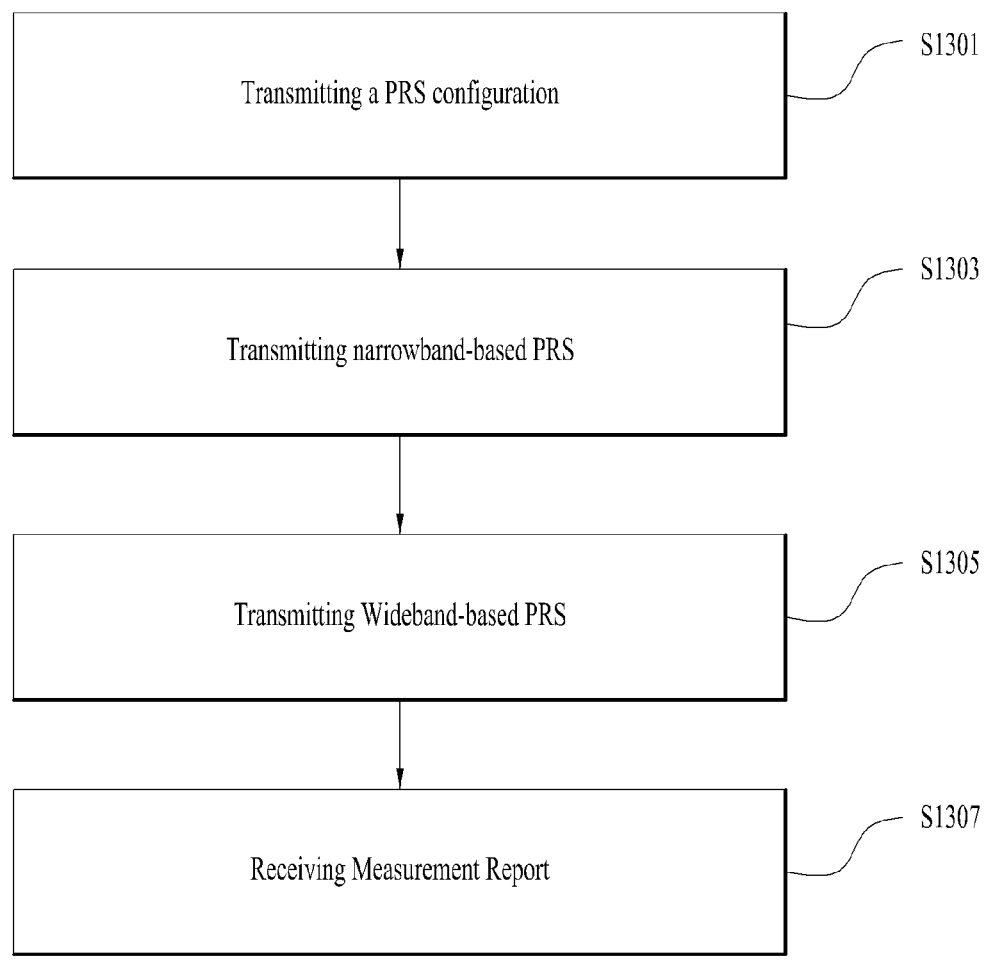

FIG. 13 illustrates an operation implementation example of the BS according to an embodiment of the present disclosure. The BS may transmit a PRS configuration to the UE (S1301). In this case, an example of the PRS configuration that the BS transmits may conform to steps #1 and #2 of Embodiment 1, steps #1 and #2 of Embodiment 2, step #1 of Embodiment 3, Embodiment 5, Embodiment 6, and/or Embodiment 8. If the location server transmits the PRS configuration to the UE, step S1301 may be omitted.

The BS may transmit a narrowband-based PRS to the UE (S1303). A specific embodiment for narrowband-based PRS transmission may conform to step #2 of Embodiment 1 and/or step #2 of Embodiment 2.

In addition, if the UE adjusts a PRS search window using the narrowband-based PRS, the BS may transmit a wideband-based PRS to the UE based on the PRS search window (S1305). A specific embodiment in which the BS transmits the wideband-based PRS may be performed based on step #3 of Embodiment 1 and/or step #3 of Embodiment 2, specifically, based on steps #2 and #3 of the Embodiment 3. The BS that transmits the wideband-based PRS may be a BS selected according to Embodiment 4.

Next, the BS may receive a measurement report including an RSTD, a TOA, etc., from the UE (S1307). A specific embodiment in which the BS receives the measurement report from the UE may be based on step #4 of Embodiment 1, step #4 of Embodiment 2, and/or Embodiment 7. However, if the UE transmits the measurement report to the location server, step S1307 may be omitted. In addition, upon receiving the measurement report from the UE, the BS may transmit the received measurement report to the location server.

Figure 14:
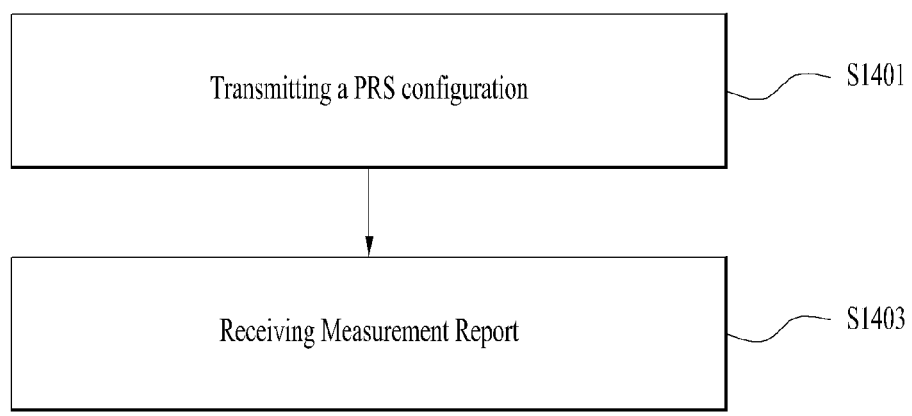

FIG. 14 is a diagram for explaining an operation implementation example of the location server. Referring to FIG. 14, the location server may transmit a PRS configuration to the UE (S1401). In this case, an example of the PRS configuration that the location server transmits may be based on steps #1 and #2 of Embodiment 1, steps #1 and #2 of Embodiment 2, step #1 of Embodiment 3, Embodiment 5, Embodiment 6, and/or Embodiment 8. If the BS transmits the PRS configuration to the UE, step S1401 may be omitted. Meanwhile, the location server may receive a measurement report including an RSTD, a TOA, etc. from the UE and/or the BS (S1403). A specific embodiment in which the location server receives the measurement report from the UE and/or the BS may be based on step #4 of Embodiment 1, step #4 of Embodiment 2, and/or Embodiment 7.

Figure 15:
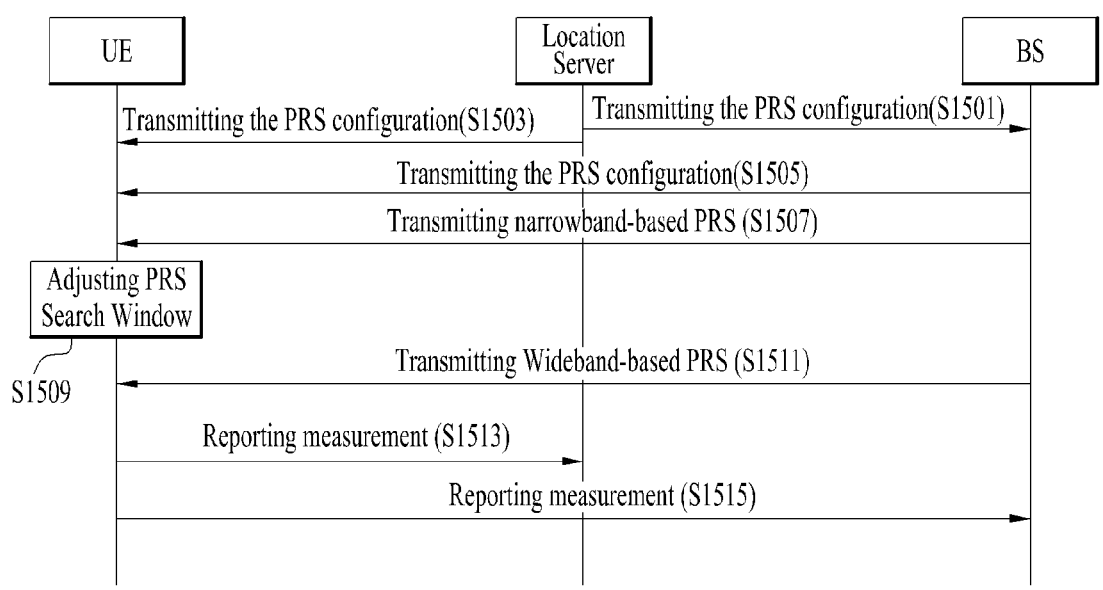

FIG. 15 illustrates an operation implementation example of the network according to an embodiment of the present disclosure. Referring to FIG. 15, the location server may transmit a PRS configuration to the UE and/or the BS (S1501 and S1503). In this case, if step S1503 is omitted, the BS may transmit the PRS configuration to the UE in step S1501 (S1505). However, the PRS configuration transmitted in step S1505 may be the PRS configuration that the BS receives from the location server in step S1501 or the PRS configuration that the BS configures. If the BS transmits the PRS configuration configured thereby to the UE in step S1505, step S1501 may also be omitted.

In addition, an example of the PRS configuration transmitted in steps S1501 to S1505 may be based on steps #1 and #2 of Embodiment 1, steps #1 and #2 of Embodiment 2, and step #1 of Embodiment 3, Embodiment 5, Embodiment 6, and/or Embodiment 8.

Meanwhile, the BS may transmit a narrowband-based PRS to the UE (S1507). In this case, a specific embodiment for narrowband-based PRS transmission may conform to step #2 of Embodiment 1 and/or step #2 of Embodiment 2.

The UE may adjust a PRS search window according to the PRS configuration based on the received narrowband-based PRS (S1509) and receive a wideband-based PRS within the adjusted PRS search window (S1511). That is, in step S1511, the BS may transmit the wideband-based PRS within the PRS search window.

In this case, a procedure for selecting a BS/TP according to Embodiment 4 may be added between steps S1509 and S1511 or between steps S1509 and S1511. That is, the BS that transmits the wideband-based PRS in S1511 may be a BS selected according to Embodiment 4. In addition, steps S1509 and S1511 may be performed based on step #3 of Embodiment 1 and/or step #3 of Embodiment 2, specifically, based on steps #2 and #3 of Embodiment 3.

The UE may report an RSTD, a TOA, etc., which are finally measured based on the received narrowband-based PRS and/or wideband-based PRS, to the BS and/or the location server (S1513 and S1515). A specific embodiment for these steps may be based on step #4 of Embodiment 1, step #4 of Embodiment 2, and/or Embodiment 7. Meanwhile, if step S1513 is omitted, the BS may transmit the measurement report received in step S1515 to the location server.

That is, Embodiments 1 to 8 described later may be individually implemented according to FIGS. 12 to 15 but may be implemented in combination with two or more embodiments according to FIGS. 12 to 15.

Embodiment 1: High-level Concept of Hierarchical Approach #1

According to the following steps of Embodiment 1, narrowband-based PRSs of X(>0) MHz and wideband based PRSs of Y(>0) MHz may be transmitted sequentially or stepwise by N(>1) TPs/BSs in different symbols and/or slots of a specific PRS occasion or different PRS occasions. Meanwhile, the PRS occasion may mean a bundle of consecutive slots and/or subframes in which PRSs are transmitted.

Step #1: Independent PRS Configuration for Each TP/BS

The location server or the BS may allocate and/or configure independent IDs to and/or for PRSs transmitted by N TPs/BSs. That is, a PRS or a PRS resource may be independently configured for each TP/BS. Here, independent configuration/allocation of a PRS ID for/to each TP/BS may mean that a PRS resource corresponding to a related PRS ID is configured/allocated for/to each TP/BS.

In other words, when the PRS ID is the same, a resource for PRS transmission may be the same and, when the PRS ID is different, the resource for PRS transmission may be different. Meanwhile, the resource for PRS transmission may mean a time resource, a frequency resource, and/or a sequence for each PRS.

(2) Step #2: Narrowband-Based PRS Transmission and Reception

In order to measure an OTDOA using the narrowband-based PRS of X(>0) MHz, the location server or the BS may indicate/configure, to/for the UE, an initial value of information associated with a PRS search window used for RSTD measurement of the UE, such as an expected RSTD, an expected ToA, an expected RSTD uncertainty, an expected ToA uncertainty, and/or the size of the PRS search window.

In addition, upon receiving an initial value of at least one of the expected RSTD, the expected ToA, the expected RSTD uncertainty, the expected ToA uncertainty, or the size of the PRS search window from the BS or the location server, the UE may receive PRSs of the X MHz transmitted by N TPs/BSs and measure a ToA and/or RSTD value.

The expected RSTD value may be determined based on a difference in a transmission time of a PRS, a difference in a transmission time of a PRS occasion, and a difference in an expected propagation time, between two cells (e.g., a neighbor cell and a reference cell).

The expected RSTD uncertainty is related to priori estimation of the location server and/or the BS for the position of the UE. The PRS search window may be configured based on the expected RSTD value and the expected RSTD uncertainty. For example, the center of the PRS search window may be determined based on the expected RSTD value and the size of the PRS search window may be determined based on the expected RSTD uncertainty.

The expected ToA may be determined based on a transmission time of a PRS transmitted from one cell to the UE, a transmission time of a PRS occasion, and an expected propagation time. In addition, the expected ToA uncertainty is related to priori estimation of the location server and/or the BS for the position of the UE.

The PRS search window may be configured based on the expected ToA and the expected ToA uncertainty. For this purpose, when necessary, the expected RSTD and/or the expected RSTD uncertainty may also be calculated based on the expected ToA and the expected ToA uncertainty.

Meanwhile, the above-described operation of the UE may be configured/indicated for/to the UE by the location server or the BS.

In step #2, the narrowband-based PRS may be an SS/PBCH block. In addition, in step #2, the narrowband-based PRS should not always be used and the wideband-based PRS may be used. However, in order to reduce computational complexity of the UE for calculating the ToA and/or RSTD value for wideband-based PRS search window adjustment, it may be desirable to use the narrowband-based PRS.

(3) Step #3: PRS Search Window Adjustment and Wideband-Based PRS Transmission/Reception In order to measure secondary OTDOA based on the wideband-based PRS of Y(>0) MHz, the UE may adjust or reconfigure at least one of the expected RSTD, the expected ToA, the expected RSTD uncertainty, the expected ToA uncertainty, or the size of the PRS search window, using the ToA and RSTD measured in step #2. In addition, the UE may adjust or reconfigure the PRS search window based on the adjusted or reconfigured expected RSTD uncertainty and/or the size of the PRS search window. Upon receiving wideband-based PRSs of Y(>0) MHz transmitted by the M TPs/BSs, the UE may measure ToA and RSTD values for the received wideband-based PRSs.

Meanwhile, the number of M TPs/BSs may be less than or equal to the number of N TPs/BSs that have transmitted the narrowband-based PRSs in step #2. In addition, the M TPs/BSs may be included in the N TPs/BSs. In other words, the M TPs/BSs may be TPs/BSs selected from among the N TPs/BSs. This selection process will be described with reference to Embodiment 4.

In step #3, the wideband-based PRS may be a CSI-RS. The operation of the UE may be configured or indicated by the BS or the location server.

In step #3, instead of adjusting or reconfiguring at least one of the expected RSTD, expected ToA, the range of the expected RSTD uncertainty, the range of the expected ToA uncertainty, or the size of the PRS search window, the UE may report the primarily measured ToA and/or RSTD value (i.e., measured in step #2) to the BS or the location server and the BS or the location server may reconfigure or indicate, for or to the UE, at least one of the expected RSTD, the expected ToA, the expected RSTD uncertainty, the expected ToA uncertainty, or the size of the PRS search window, based on a wideband-based PRS to be transmitted secondarily.

The UE may adjust or reconfigure the PRS search window based on at least one of the reconfigured or indicated expected RSTD, expected ToA, expected RSTD uncertainty, expected ToA uncertainty, or size of the PRS search window.

(4) Step #4: Measurement Reporting

The UE may report the RSTD and/or ToA value finally measured in step #3 to the location server or the BS. On the other hand, a UE that does not require accurate location measurement through the wideband-based PRS in step #3 may be configured or indicated to omit the ToA and/or RSTD measurement and reporting based on the wideband-based PRS.

While, for convenience of description, the narrowband-based PRS is used in step #2 and the wideband-based PRS is used in step #3, the bandwidth Y of the PRS transmitted in step #3 may equal to or smaller than the bandwidth X of the PRS transmitted in step #2. For example, a narrowband-based (or wideband-based) PRS having a first bandwidth (e.g., X MHz) may be transmitted in step #2 to adjust the size of the PRS search window and a narrowband-based (or wideband-based) PRS having a second bandwidth (e.g., Y MHz) less than the first bandwidth may be transmitted within the adjusted PRS search window.

In order to improve positioning accuracy, the location server or the BS may increase a sampling rate to configure or indicate measurement of a ToA and/or an RSTD for the PRS of Y MHz transmitted in step #3 for or to the UE.

According to Embodiment 1, the UE primarily measures the ToA and/or the RSTD for the narrowband-based PRS by appropriately determining or configuring values of the bandwidth X and the bandwidth Y, thereby significantly reducing the size of the PRS search window. Therefore, computational complexity of the UE for calculating a cross-correlation operation may be considerably reduced as compared with the case of performing a cross-correlation operation using only the wideband-based PRS without transmitting the narrowband-based PRS.

Embodiment 2: High-Level Concept of Hierarchical Approach #2

The following steps of Embodiment 2 describe a method of measuring the ToA and/or the RSTD by primarily transmitting narrowband-based PRSs having the same sequence by a plurality of TPs/BSs and secondarily transmitting wideband-based PRSs having independent sequences for respective TPs/BSs by a plurality of TPs/BSs. Meanwhile, the plurality of TPs/BSs may form one TP/BS group/set.

(1) Step #1: Common PRS Configuration for Multiple TPs

The location server or a positioning BS allocates the same sequence to PRSs transmitted by N (>1) TPs/BSs. For example, the location server or the positioning BS may allocate the same PRS ID to the N TPs/BSs so as to perform sequence initialization with the same value. The same PRS ID may mean that resources for transmitting the PRSs may be the same. Accordingly, the N TPs/BSs to which the same PRS ID is allocated may transmit the PRSs using the same resource.

When the same sequence is allocated to a plurality of TPs/BSs, since PRSs received from the plurality of TPs/BSs may be detected by performing correlation only once, computational complexity of the UE may be reduced. Since TPs/BSs using the same PRS ID use the same PRS resource, use of the same PRS resource by the plurality of TPs/BSs may imply that PRS sequences of the TPs/BSs using the same PRS ID are the same.

(2) Step #2: Narrowband-based PRS transmission and reception

In order to measure an OTDOA using a narrowband-based PRS of X(>0) MHz, the location server or the BS may indicate/configure, to/for the UE, an initial value of information associated with a PRS search window used for RSTD measurement of the UE, such as an expected RSTD, an expected ToA, an expected RSTD uncertainty, an expected ToA uncertainty, and/or the size of the PRS search window.

In addition, upon receiving an initial value of at least one of the expected RSTD, the expected ToA, the expected RSTD uncertainty, the expected ToA uncertainty, or the size of the PRS search window from the BS or the location server, the UE may receive PRSs of X MHz transmitted by N TPs/BSs and measure ToAs and/or RSTDs.

Meanwhile, the above-described operation of the UE may be configured/indicated for/to the UE by the location server or the BS.

In step #2, the narrowband-based PRS may be an SS/PBCH block. In addition, in step #2, the narrowband-based PRS should not always be used and the wideband-based PRS may be used. However, in order to reduce computational complexity of the UE for calculating ToAs and/or RSTDs for wideband-based PRS search window adjustment, it may be desirable to use the narrowband-based PRS.

(3) Step #3: PRS Search Window Adjustment and Wideband-Based PRS Transmission/Reception The location server or the positioning BS allocates independent PRS IDs and/or PRS sequences to M TPs/BSs and measures secondary OTDOA using the wideband-based PRS of Y(>0) MHz. To this end, the UE may adjust or reconfigure the expected RSTD uncertainty value and/or the size of the PRS search window using the ToAs and RSTDs measured in step #2.

In step #2, since the UE has measured ToAs for all PRSs having the same sequence, it may be difficult to calculate an RSTD for each of the PRSs. Therefore, the UE may approximately adjust/reconfigure an initial value of information related to the PRS search window, such as the expected RSTD and the expected RSTD uncertainty configured in step #2 or approximately adjust/reconfigure the PRS search window, based on the ToAs measured for the PRSs transmitted by the N TPs/BSs.

For example, the UE may adjust/reconfigure an initial value of information related to the PRS search window, such as the expected RSTD uncertainty, or adjust/reconfigure the PRS search window, based on the first peak or first impulse response timing and the last peak timing for N PRSs.

Meanwhile, the number of M TPs/BSs may be less than or equal to the number of N TPs/BSs that have transmitted the narrowband-based PRSs in step #2. In addition, the M TPs/BSs may be included in the N TPs/BSs. In other words, the M TPs/BSs may be TPs/BSs selected from among the N TPs/BSs. This selection process will be described with reference to Embodiment 4. In step #3, the wideband-based PRS may be a CSI-RS.

Figure 16:
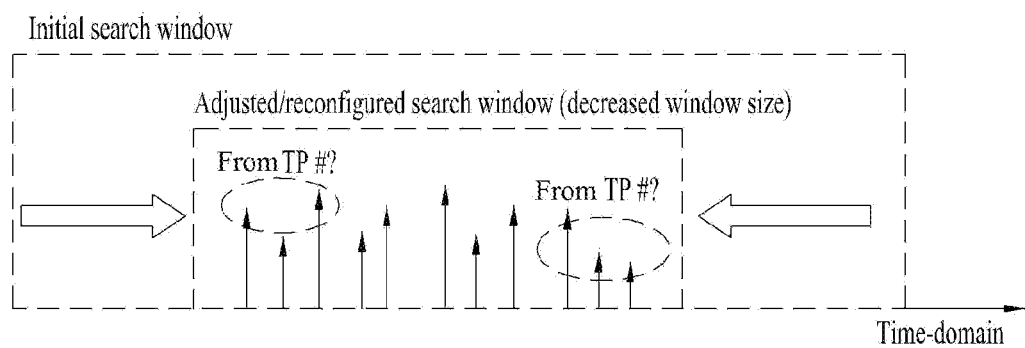
FIGS. 16 and 17 illustrate implementation examples of configuring a search window for a positioning reference signal (PRS) according to an embodiment of the present disclosure.

FIG. 16 is a diagram illustrating adjustment of the PRS search window in step #3. Referring to FIG. 16, arrows in a small box indicate impulse responses or peak signals measured through a cross-correlation operation for PRSs transmitted by N TPs/BSs. Each of the plural peaks corresponds to a PRS transmitted by a specific TP/BS. However, since sequences of the PRSs are the same, the UE may not identify a TP/BS by which each PRS is transmitted. Therefore, the UE may adjust or reconfigure a PRS search window based on the first peak or first impulse response timing and the last peak timing acquired through the cross-correlation operation for PRSs transmitted by a plurality of TPs/BSs.

In addition, M TPs/BSs may transmit wideband-based PRSs of Y(>0) MHz with independent PRS sequences and/or PRS IDs to the UE. The UE may perform ToA and RSTD measurement for the wideband-based PRSs using the adjusted/reconfigured PRS search window. The above-described operation of step #3 may be indicated or configured by the positioning BS or the location server.

(4) Step #4: Measurement Reporting

The UE may report the RSTD and/or ToA value finally measured in step #3 to the location server or the BS.

While, for convenience of description, the narrowband-based PRS is used in step #2 and the wideband-based PRS is used in step #3, the bandwidth Y of the PRS transmitted in step #3 may be equal to or smaller than the bandwidth X of the PRS transmitted in step #2. For example, a narrowband-based (or wideband-based) PRS having a first bandwidth (e.g., X MHz) may be transmitted in step #2 to adjust the size of the PRS search window and a narrowband-based (or wideband-based) PRS having a second bandwidth (e.g., Y MHz) less than the first bandwidth may be transmitted within the adjusted PRS search window.

In order to improve positioning accuracy, the location server or the BS may increase a sampling rate to configure or indicate measurement of a ToA and/or an RSTD for the PRS of Y MHz transmitted in step #3 for or to the UE.

On the other hand, since the same sequence is allocated to all narrowband-based PRSs in Embodiment 2, it may be difficult for the UE to measure or report an RSTD using only the narrowband-based PRSs. However, the size of the PRS search window may be reduced based on step #3 of Embodiment 2. Thereby, in precise location measurement through the wideband-based PRSs, a cross-correlation operation for M wideband-based PRSs that the UE should perform may be significantly reduced.

In Embodiment 1 and Embodiment 2, the narrowband and the wideband have been mentioned purely to refer to or exemplify configuration of X and Y. X and Y values satisfying X<Y, X>Y, or X=Y may be configured. Embodiment 1 and Embodiment 2 may be applied altogether or parts of each of Embodiment 1 and Embodiment 2 may be combined or applied/extended to be used for wireless positioning. Accordingly, implementation of the present disclosure according to combination of Embodiment 1 and Embodiment 2 should also be regarded as being included in the idea of the present disclosure. The following embodiments may be provided as specific examples of application/adaptation/extension of Embodiment 1 and Embodiment 2 described above.

Embodiment 3: TP-Group Based Hierarchical Approach

In Embodiment 3, a configuration of measuring an RSTD and a ToA by allocating the same PRS sequence to a plurality of TPs/BSs and thereby adjusting/reconfiguring a PRS search window in Embodiment 2 will be described in more detail.

(1) Step #1: TP/BS Group for Narrowband PRS Transmission Based on Single Frequency Network (SFN)

In Embodiment 2, a wireless network BS or a location server responsible for a positioning operation may categorize N(>1) TPs/BSs into G TP/BS groups/sets, where G is equal to or less than N, and configure TPs/BSs included in the same group to use the same PRS sequence.

For example, TPs/BSs belonging to each group may use the same sequence using the same sequence initialization value based on one PRS ID. The location server or the positioning BS may allocate one PRS configuration to TPs/BSs included in the same TP/BS group/set. For example, the location server or the positioning BS may configure/indicate the same PRS information (PRS-Info) or the same PRS resource configuration for/to TPs/BSs included in the same TP/BS group/set. In other words, the location server or the positioning BS may cause TPs/BSs included in a specific TP/BS group/set to share one PRS configuration/PRS resource.

TPs/BSs included in each TP/BS group/set to which the same PRS configuration/PRS resource is allocated may use the same time and frequency resources to transmit a narrowband-based PRS of X(>0) MHz to the UE.

That is, since one PRS resource or PRS configuration is shared by a plurality of TPs/BSs included in one TP/BS group/set, time-frequency resources used by the TPs/BSs in slots in which PRSs are transmitted may be the same. For example, TPs/BSs included in each TP/BS group/set may transmit the PRSs using an SFN scheme.

Figure 17:
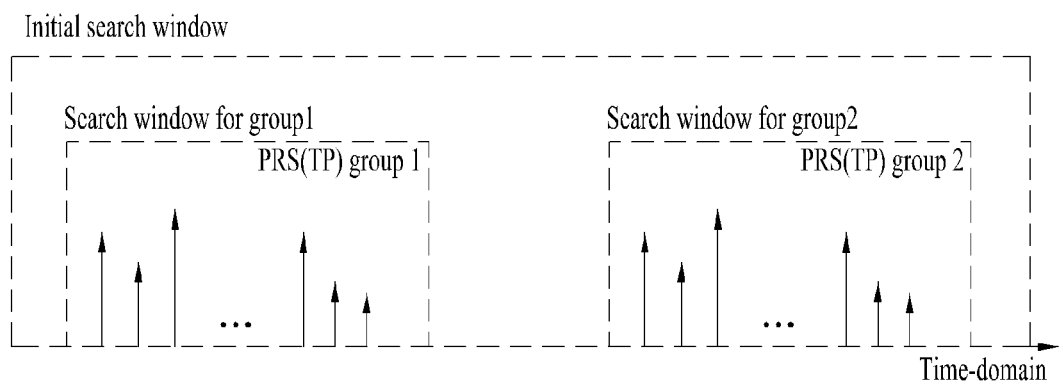

(2) Step #2: PRS Search Window Determination and/or PRS Search Window Reconfiguration/Adjustment for Each TP/BS Group/Set 1) Configuration of Multiple PRS Search Windows FIG. 17 illustrates an example of reconfiguring/adjusting a PRS search window for each TP/BS group/set. Referring to FIG. 17, the UE may measure ToAs and/or impulse responses for PRSs transmitted by TPs/BSs included in each TP/BS group/set and determine/configure or reconfigure/adjust a PRS search window in which measurement or a cross-correlation operation for a PRS transmitted by each TP/BS group/set is to be performed based on a time at which a ToA of each TP/BS group/set occurs. In this case, a method of reconfiguring/adjusting the PRS search window for each TP/BS group/set may be based on the description of step #3 of Embodiment 2. In other words, the UE may use a different PRS search window for each TP/BS group/set. Meanwhile, the above-described operation of the UE may be configured/indicated by the location server or the BS.

2) Configuration of Single PRS Search Window

The UE may reconfigure/adjust the PRS search window, which is configured using the initially configured expected RSTD and expected RSTD uncertainty, based on a ToA value for the narrowband-based PRS of X(>0) MHz transmitted in step #1. In other words, the UE may use a common single PRS search window for all TP/BS groups/sets without using different PRS search windows for the TP/BS groups/sets.

(3) Step #3: Wideband-Based PRS Transmission and Reception

The location server or the BS may allocate a different PRS ID and transmit a wideband-based PRS of Y(>0) MHz to each of TPs/BSs included in each TP/BS group/set. In other words, the location server or the BS may allocate an independent PRS configuration or PRS resource to each of TPs/BSs included in each TP/BS group/set.

The UE may measure a ToA and/or an RSTD of the TPs/BSs included in each TP/BS group/set based on the PRS search window configured for each TP/BS group/set and report the measured result to the location server or the BS.

Meanwhile, the bandwidth Y of the PRS transmitted in step #3 may equal to or smaller than the bandwidth X of the PRS transmitted in step #2. For example, a narrowband-based (or wideband-based) PRS having a first bandwidth (e.g., X MHz) may be transmitted in step #2 to adjust the size of the PRS search window and a narrowband-based (or wideband-based) PRS having a second bandwidth (e.g., Y MHz) less than the first bandwidth may be transmitted within the adjusted PRS search window.

In order to improve positioning accuracy, the location server or the BS may increase a sampling rate to configure or indicate measurement of a ToA and/or an RSTD for the PRS of Y MHz transmitted in step #3 for or to the UE.

According to Embodiment 3, the UE may first perform ToA and RSTD measurement for a narrowband-based PRS and use a relatively small PRS search window upon receiving a wideband-based PRS, so that computational complexity of the UE may be reduced.

According to Embodiment 3, the location server or the BS may configure a PRS search window for each TP/BS group/set by appropriately configuring/determining a TP/BS group/set for a target UE. Complexity of a cross-correlation operation of the UE when the UE receives PRSs transmitted by TPs belonging to each group/set may be reduced by configuring several search windows each having a small size. For example, as illustrated in FIG. 17, a PRS search window may be configured for each TP/BS group/set or for a PRS ID assigned to a TP/BS group/set, so that the UE may measure the ToA and/or the RSTD based on the PRS search window. Meanwhile, the location server or the BS may determine TPs/BSs located at similar locations as being included in the same TP/BS group/set.

Embodiment 4: Selection of TP/BS Transmitting Wideband-Based PRS

Prior to step #3 of Embodiment 1 or step #3 of Embodiment 2, a procedure for finally selecting M TPs/BSs by which wideband-based PRSs are to be transmitted may be added. In this case, the M TPs/BSs may be included in N TPs/BSs transmitting narrowband-based PRSs, and the M TPs/BSs may be equal to or smaller than the N TPs/BSs in number. In addition, a procedure for selecting TPs/BSs by which wideband-based PRSs are to be transmitted among TPs/BSs included in each TP/BS group/set may be added prior to step #3 of Embodiment 3. For example, the UE may select TPs/BSs with strong line of sight (LoS) characteristics as follows.

The location server or the BS may allocate different PRSs (e.g., PRS configuration units such as different PRS IDs and/or different PRS resources) to all TPs/BSs and additionally transmit a narrowband-based PRS of X(>0) MHz or a wideband-based PRS of Y(>0) MHz for selecting TPs/BSs. However, in the case of Embodiment 1, TPs/BSs may be selected using the narrowband-based PRS transmitted in step #2 without the need to transmit the additional narrowband-based (or wideband-based) PRS. In Embodiments 2 and 3, since each TP/BS group/set has the same PRS ID, the same PRS resource, and/or the same PRS configuration, the UE is unaware of distinguishing between TPs/BSs included in each TP/BS group/set. Therefore, the UE may need to transmit an additional narrowband-based (or wideband-based) PRS for selecting TPs/BSs by which wideband-based PRSs are to be transmitted. However, in the case of Embodiment 1, since TPs/BSs transmitting the narrowband-based PRSs have different PRS IDs, different PRS resources, and/or different PRS configurations, the location server or the BS may select TPs/BSs by which the wideband-based PRSs are to be transmitted and simultaneously reconfigure/adjust the PRS search window, only by a single narrowband-based PRS transmission.

On the other hand, the UE may calculate the first peak and/or impulse response for each narrowband-based PRS through a cross-correlation operation using narrowband-based PRSs received from a plurality of TPs/BSs. In this case, the UE may report, to the location server or the BS, information about favorable TPs/BSs, i.e., favorable PRS IDs (or PRS resources/PRS configurations), among TPs/BSs having the first peak and/or impulse response above a specific threshold value, except for TPs/BSs corresponding to PRS IDs (or PRS resources/PRS configurations) having the first peak and/or impulse response less than or equal to the specific threshold value.

Alternatively, the UE may be configured/indicated by the location server or the BS to select and report M(>1) PRS IDs (or PRS resources/PRS configurations) with the largest first peak and/or impulse response calculated through the cross-correlation operation, etc. Then, the UE may report the M PRS IDs (or PRS resources/PRS configurations) with the largest first peak and/or impulse response to the location server or the BS. In other words, as in Embodiment 2 and/or Embodiment 3, when a plurality of TPs/BSs constitutes one TP/BS group/set, the UE may be configured/indicated by the BS or the location server to report a plurality of PRS IDs (or PRS resources/PRS configurations) having the largest first peak for each TP/BS group/set.

Alternatively, a threshold value of the first peak and/or impulse response may be several constant values. For example, when the threshold value of the first peak and/or impulse response is $\alpha(j)$ and the number of TPs/BSs with the threshold value exceeding $\alpha(j)$ is greater than $\beta(j)$, the UE may report information about the corresponding TPs/BSs to the location server or the BS. If $1 \leq j \leq L$, $\alpha(j)$ and $\beta(j)$ may satisfy the following relationship: $\alpha(1) \geq \alpha(2) \geq \ldots \geq \alpha(L)$ and $\beta(L) \geq \ldots \geq \beta(2) \geq \beta(1)$.

Finally, when M TPs/BSs by which the wideband-based PRSs are to be transmitted are determined or selected, the UE may additionally reconfigure/adjust an expected RSTD and an expected RSTD uncertainty by considering only the M TPs/BSs. In addition, the UE may adjust/reconfigure a PRS search window in consideration of only the M TPs/BSs.

In addition, the UE may finally determine/select the M TPs/BSs by which the wideband-based PRSs are to be transmitted and report the M TPs/BSs to the location server or the BS. Alternatively, the location server or the BS may indicate/configure the reconfigured/adjusted expected RSTD and expected RSTD uncertainty to/for the UE.

Meanwhile, in the above description, the first peak and/or impulse response may mean a normalized first peak and/or a normalized impulse response.

Embodiment 5: Configuration and/or Indication of Narrowband-Based PRS and/or Wideband-Based PRS A configuration unit for configuring a specific PRS such as "PRS-Info", which is a PRS configuration parameter of the standard specification 3GPP TS 36.355, for the UE may be defined as a PRS unit/resource. For example, each PRS resource may include a configuration regarding a PRS resource ID, an occupied bandwidth, a periodicity, and the number of consecutive slots in which PRSs are continuously transmitted.

Additionally, one or more PRS resources may be grouped and defined as a PRS resource group/set and this concept may be introduced in a new RAT positioning protocol (NRPP). For example, the location server or the wireless network BS may configure a plurality of PRS IDs for the UE as one PRS group/set.

On the other hand, while a PRS may be a cell-specific signal and/or a broadcasting signal, a PRS configuration or a PRS resource configuration may be regarded as a UE-specific configuration and/or a UE group-specific configuration.

In addition, a plurality of bandwidth part (BWP) IDs may be configured in linkage with a single PRS ID and/or a single PRS resource ID. For example, when the location server performs a PRS-related configuration such as "PRS-Info" or "PRS resource" for the UE, two or more BWP IDs may be linked to one "PRS-Info" or one "PRS resource". In other words, two or more multiple BWP IDs may be linked to one PRS ID or one PRS resource. In addition, a part of a PRS occasion or a PRS occasion group through which the PRS is transmitted may be connected or linked to a specific BWP ID. In this case, the PRS occasion or the PRS occasion group may mean some slots among a plurality of consecutive slots in which the PRS is transmitted.

For example, BWP #0 and BWP #1 may be configured in PRS #0. When one RPS occasion is composed of 6 slots, the first 3 slots may be linked to BWP #0 and the last 3 slots may be connected to BWP #1 based on a slot offset configured by the location server or the BS. As another example, when the PRS occasion group consists of two PRS occasions, the first PRS occasion within each PRS occasion group may be configured to be linked to BWP #0 and the second PRS occasion within each PRS occasion group may be configured to be linked to BWP #1. As another example, the UE may be configured/indicated to link an even-numbered PRS occasion to BWP #0 and an odd-numbered PRS occasion to BWP #1.

Alternatively, a specific BWP among configured BWPs may be used in units of symbols, slots, PRS occasions, or PRS occasion groups in which a PRS is transmitted by activating/deactivating the specific BWP or switching to the specific BWP through dynamic signaling such as a DCI/MAC-control element (CE).

Alternatively, the UE may be configured/indicated such that PRS BWP #0 expires at a timing when a specific PRS occasion or a PRS occasion group expires and PRS BWP #1 is automatically activated. In other words, the UE may be configured such that an activated BWP of a specific PRS (e.g., PRS #0) is switched at a specific timing. For example, a BWP of PRS #0 may be switched from BWP #0 to BWP #1 after one PRS occasion and this may be configured/indicated for/to the UE by the BS or the location server.

In addition, a specific BWP or BWP ID may be configured as dedicated BWP(s) for a positioning operation. Alternatively, a specific BWP may be limitedly configured during a PRS configuration. Since the UE needs to receive PRSs transmitted by a plurality of TPs/BSs and perform measurement for the PRSs, it may be appropriate to commonly use the same/similar frequency band by the plurality of TPs/BSs.

During a PRS configuration such as "PRS-Info" or a PRS resource, a PRS bandwidth may not be the same as a carrier bandwidth or a BWP. For example, the PRS bandwidth may be smaller than a BWP or carrier bandwidth, including a PRS. The UE may receive information about a starting RB index and the number of RBs from the location server or the BS to configure the PRS bandwidth.

Thereby, during the PRS configuration such as the PRS resource, the PRS bandwidth may be flexibly configured in a specific BWP or carrier bandwidth. In addition, operations based on Embodiment 1 and Embodiment 2 may be performed by allocating PRS IDs to a narrowband-based PRS and a wideband-based PRS transmitted by a specific TP/BS. In this case, the narrowband-based PRS and the wideband-based PRS transmitted by the specific TP/BS may use the same Tx beam.

In addition, the location server or the BS may indicate or configure linkage information between PRS IDs to or for the UE, so that the UE may recognize that different PRSs having different PRS resources etc. have been transmitted by the same TP/BS or TPs/BSs of almost the same location. For example, the UE may recognize that PRSs included in the same group/set have been transmitted from the same TP/BS or collocated TPs/BSs in a similar location. This operation may be configured by the BS or the location server for the UE.

Embodiment 6: Configuration of PRS Resource and PRS Resource Set

If only one PRS (e.g., PRS ID) is allocated to a specific TP/BS supporting the NR system based on multiple narrow Tx beams, it may be difficult for the UE to distinguish between PRSs transmitted through different Tx beams. Further, although PRSs are transmitted through the same Tx beam in Embodiment 1 to Embodiment 3, if PRS bandwidth configurations are different, computational complexity of the UE may be reduced. Based on this situation, the following configurations of a PRS resource and a PRS resource set will now be described.

A PRS unit/resource and/or a PRS resource group/set may be defined in units of a PRS configuration in order to configure a specific PRS, such as the PRS configuration parameter "PRS-Info" of 3GPP TS 36.355 for the UE. For example, for the PRS configuration, each PRS resource includes a PRS resource ID, an occupied bandwidth, a periodicity, and the number of consecutive slots in which PRSs are transmitted. In addition, one or more PRSs (e.g., PRS resources or PRS IDs) may be grouped and configured as one PRS resource group/set. For example, a plurality of PRS IDs may be configured as one PRS group/set.

In addition, the UE may recognize that PRSs (e.g., PRS resources or PRS IDs) transmitted in a specific PRS resource group/set are transmitted by TPs/BSs at the same location. Alternatively, the location server or the BS may configure/ indicate to the UE that PRSs (e.g., PRS resources or PRS IDs) transmitted in a specific PRS resource group/set are transmitted in TPs/BSs at the same location. Meanwhile, the TPs/BSs at the same location may mean that the TPs/BSs are at the same geographical location. Further, the TPs/BSs at the same location or the same geographic location may consequently mean the same TPs/BSs.

The location server or the BS may configure/indicate to the UE that different PRSs (e.g., PRS resources or PRS IDs) transmitted in a specific PRS resource group/set are transmitted through the same Tx beam. For example, the BS or the location server may configure or indicate a spatial quasi co-location (QCL) (e.g., QCL type D) between PRSs (e.g., PRS resources or PRS IDs) for or to the UE.

When a spatial QCL between different PRSs (e.g., PRS resources or PRS IDs) included in a specific PRS resource group/set is configured, it may be expected that the different PRSs will be transmitted through the same Tx beam by the same TP/BS. In other words, the UE may expect that different PRSs included in a specific PRS resource group/set will be transmitted by the same TP/BS and, among the different PRSs, PRSs for which a spatial QCL (e.g., QCL type D) is configured are transmitted through the same Tx beam. That is, one PRS resource or one PRS ID may be associated with one Tx beam and, if the same spatial QCL is configured for different PRSs corresponding to different PRS resources or different PRS IDs, the different PRSs may be transmitted through the same Tx beam.

Based on Embodiment 6 described above, when the narrowband-based PRS (e.g., a narrowband-based PRS resource) and the wideband-based PRS (e.g., a wideband-based PRS resource) are transmitted through a specific Tx beam by a specific TP/BS, complexity of the UE may be reduced by using the narrowband-based PRS and the wideband-based PRS selectively or using the narrowband-based PRS and the wideband-based PRS altogether as in Embodiment 1 or Embodiment 3.

Embodiment 7: RSTD Reporting Method (Single-Time RSTD Reporting: One-Shot PRS Transmission and Reception)

Figure 18:
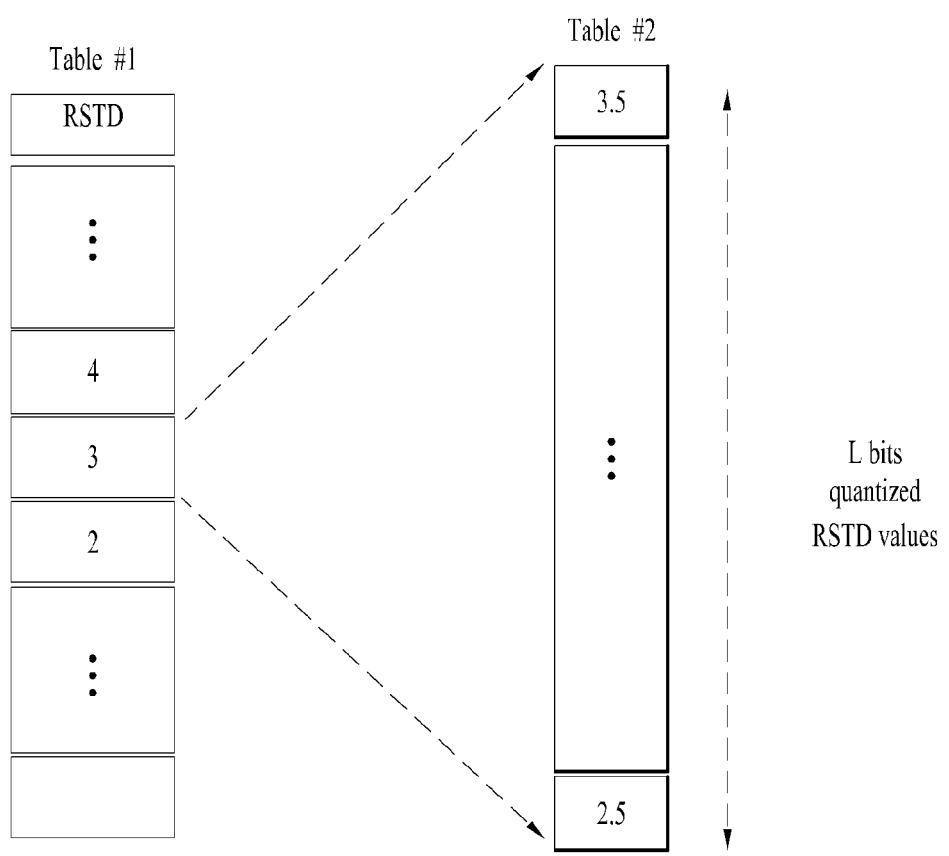
FIG. 18 illustrates an implementation example of reporting reference signal time difference (RSTD) measurement according to an embodiment of the present disclosure.

FIG. 18 is a diagram illustrating an RSTD reporting method according to Embodiment 7. Embodiment 7 will now be described with reference to FIG. 18.

The UE may be configured or indicated by the location server or the BS with two RSTD tables including uniformly or non-uniformly quantized RSTD values for RSTD value reporting. The first table may be a table quantized at a rough level with relatively low resolution and the second table may be obtained by quantizing each RSTD value interval of the first table to L(>0) bits. Although the second table may be configured separately for each interval of the first RSTD table, this may cause excessive signaling overhead.

To solve this problem, the UE may be configured or indicated with one RSTD table by the BS or the location server. The one RSTD table may be a table in which RSTD values are defined based on indexes. In this case, the indexes may be arranged in descending or ascending order.

After performing RSTD measurement, the UE may select an RSTD value closest to the measured RSTD value from the one RSTD table. In addition, the UE may select an index corresponding to the RSTD value closest to the measured RSTD value from among RSTD values quantized to L bits based on the selected RSTD value and an RSTD value adjacent to the selected RSTD value. The UE may report an index for a corresponding value in the one RSTD table and an index for an RSTD value quantized to the L bits to the BS or the location server. In other words, the UE may report an index for the first selected RSTD value and an index for the second selected RSTD value to the BS or the location server.

Embodiment 8: Aperiodic PRS

One or more TPs/BSs may transmit PRSs, a time-domain behavior of which is configured to be aperiodic, and the UE may be configured or indicated to measure and report a ToA and/or an RSTD for the aperiodic PRSs. In addition, a reporting time-domain behavior for the ToA and/or RSTD measured using the aperiodic PRSs may also be configured or indicated to be "aperiodic" by the location server or the BS.

Meanwhile, such aperiodic PRSs may be used to measure the position of the UE or may be used to configure a PRS search window to be used by the UE to receive periodic PRSs. For example, if a plurality of TPs/BSs transmits the aperiodic PRSs to the UE and the UE reports the ToA and/or RSTD for the aperiodic PRSs to the location server or the BS, the location server or the BS may configure or indicate an expected RSTD and/or an expected RSTD uncertainty using reported information for or to the UE.

The aperiodic PRS may be used for approximate location estimation or location measurement of the UE or for a PRS search window configuration when the periodic PRS is received. The number of slots constituting a PRS occasion for the aperiodic PRS may be less than the number of slots constituting a PRS occasion for the periodic PRS. For example, the PRS occasion for the aperiodic PRS may be configured or indicated with only 1 to 3 slots. The UE may mainly use the case in which the number of slots for the aperiodic PRS is less than the number of slots for the periodic PRS to more efficiently receive the periodic PRS.

In order to measure the accurate position of the UE through aperiodic PRS transmission, the number of slots in which the PRS occasion for the aperiodic PRS is allocated may be configured or indicated for or to the UE to be greater than the number of slots in which the PRS occasion for the periodic PRS is allocated.

Meanwhile, the aperiodic PRS may be semi-dynamically or dynamically triggered or activated through positioning protocol (PP) signaling. Alternatively, the aperiodic PRS may be triggered or activated through a PDCCH and/or a DL control format indicator of the wireless network BS. The location server may transmit a signal for requesting aperiodic PRS triggering to the wireless network BS through dynamic signaling over a PP. In addition, the aperiodic PRS may be configured for the UE by the location server or the BS as a separate PRS resource different from the periodic PRS.

The PRS may be configured using one or more CSI-RS resources and a CSI-RS resource set for the PRS may be configured through a CSI-RS resource set configuration. Accordingly, the aperiodic PRS may also be configured using the CSI-RS resources. For example, an aperiodic CSI-RS resource set may be configured for the aperiodic PRS.

In this case, another RS and/or a channel such as a PDSCH may not be transmitted altogether in an OFDM symbol in which a CSI-RS resource used as a PRS is transmitted. In addition, CSI-RS resources having an RE density of 2 and/or CSI-RS resources having an RE density of 3 may be used for PRS transmission.

The various descriptions, functions, procedures, proposals, methods, and/or operation flowcharts of the present disclosure described herein may be applied to, but not limited to, various fields requiring wireless communication/connectivity (e.g., 5G) between devices.

More specific examples will be described below with reference to the drawings. In the following drawings/description, like reference numerals denote the same or corresponding hardware blocks, software blocks, or function blocks, unless otherwise specified.

Figure 19:
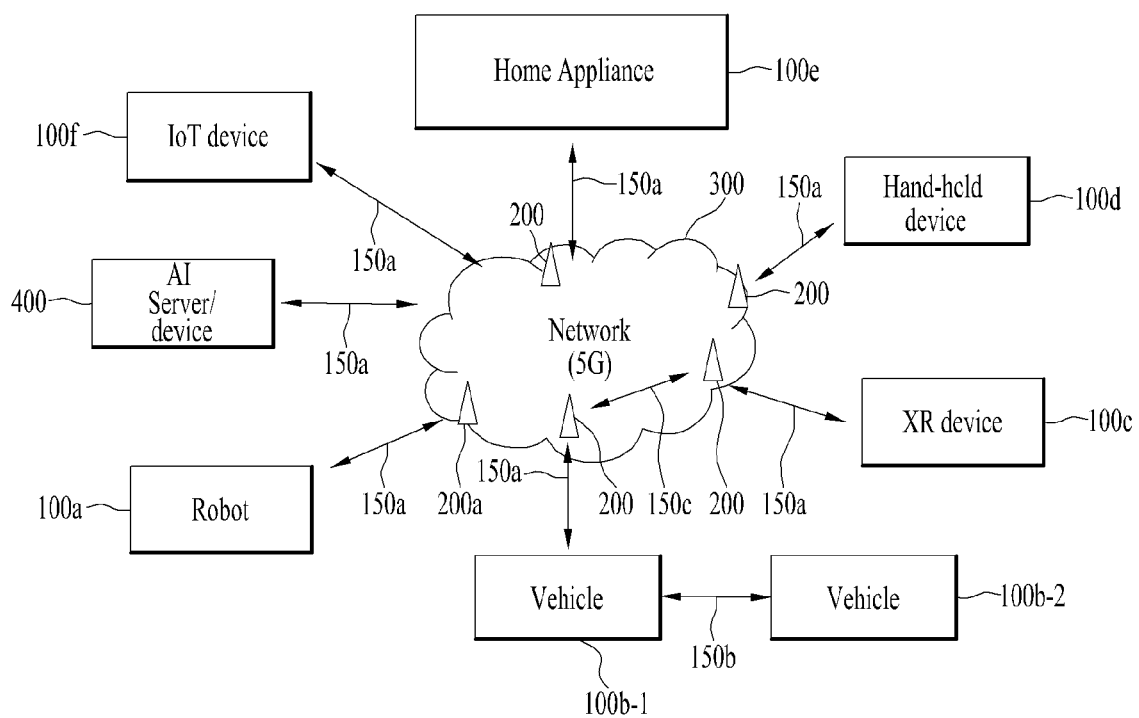
FIG. 19 illustrates an example of a communication system to which embodiments of the present disclosure are applied.

FIG. 19 illustrates a communication system 1 applied to the present disclosure.

Referring to FIG. 19, the communication system 1 applied to the present disclosure includes wireless devices, BSs, and a network. A wireless device is a device performing communication using radio access technology (RAT) (e.g., 5G NR (or New RAT) or LTE), also referred to as a communication/radio/5G device. The wireless devices may include, not limited to, a robot 100a, vehicles 100b-1 and 100b-2, an extended reality (XR) device 100c, a hand-held device 100d, a home appliance 100e, an IoT device 100f, and an artificial intelligence (AI) device/server 400. For example, the vehicles may include a vehicle having a wireless communication function, an autonomous driving vehicle, and a vehicle capable of vehicle-to-vehicle (V2V) communication. Herein, the vehicles may include an unmanned aerial vehicle (UAV) (e.g., a drone). The XR device may include an augmented reality (AR)/virtual reality (VR)/mixed reality (MR) device and may be implemented in the form of a head-mounted device (HMD), a head-up display (HUD) mounted in a vehicle, a television (TV), a smartphone, a computer, a wearable device, a home appliance, a digital signage, a vehicle, a robot, and so on. The hand-held device may include a smartphone, a smart pad, a wearable device (e.g., a smart watch or smart glasses), and a computer (e.g., a laptop). The home appliance may include a TV, a refrigerator, a washing machine, and so on. The IoT device may include a sensor, a smart meter, and so on. For example, the BSs and the network may be implemented as wireless devices, and a specific wireless device 200a may operate as a BS/network node for other wireless devices.

The wireless devices 100a to 100f may be connected to the network 300 via the BSs 200. An AI technology may be applied to the wireless devices 100a to 100f, and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without intervention of the BSs/network. For example, the vehicles 100b-1 and 100b-2 may perform direct communication (e.g. V2V/vehicle-to-everything (V2X) communication). The IoT device (e.g., a sensor) may perform direct communication with other IoT devices (e.g., sensors) or other wireless devices 100a to 100f.

Wireless communication/connections 150a, 150b, and 150c may be established between the wireless devices 100a to 100f/BS 200 and between the BSs 200. Herein, the wireless communication/connections may be established through various RATs (e.g., 5G NR) such as UL/DL communication 150a, sidelink communication 150b (or, D2D communication), or inter-BS communication (e.g. relay or integrated access backhaul (IAB)). Wireless signals may be transmitted and received between the wireless devices, between the wireless devices and the BSs, and between the BSs through the wireless communication/connections 150a, 150b, and 150c. For example, signals may be transmitted and receive don various physical channels through the wireless communication/connections 150a, 150b and 150c. To this end, at least a part of various configuration information configuring processes, various signal processing processes (e.g., channel encoding/decoding, modulation/demodulation, and resource mapping/demapping), and resource allocation processes, for transmitting/receiving wireless signals, may be performed based on the various proposals of the present disclosure.

Figure 20:
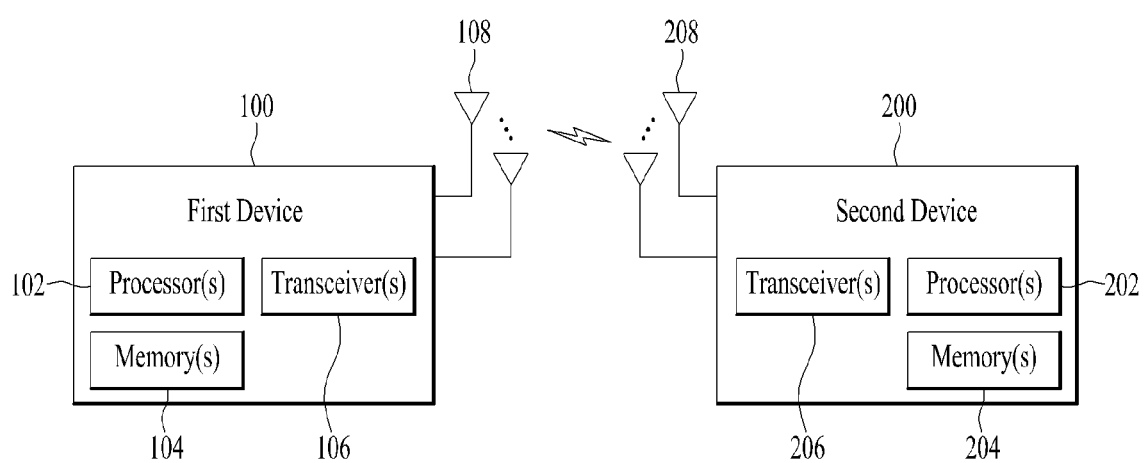
FIGS. 20 to 23 illustrate examples of various wireless devices to which embodiments of the present disclosure are applied.

FIG. 20 illustrates wireless devices applicable to the present disclosure.

Referring to FIG. 20, a first wireless device 100 and a second wireless device 200 may transmit wireless signals through a variety of RATs (e.g., LTE and NR). {The first wireless device 100 and the second wireless device 200} may correspond to {the wireless device 100x and the BS 200} and/or {the wireless device 100x and the wireless device 100x} of FIG. 20.

The first wireless device 100 may include one or more processors 102 and one or more memories 104, and further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operation flowcharts disclosed in this document. For example, the processor(s) 102 may process information in the memory(s) 104 to generate first information/signals and then transmit wireless signals including the first information/signals through the transceiver(s) 106. The processor(s) 102 may receive wireless signals including second information/signals through the transceiver(s) 106 and then store information obtained by processing the second information/signals in the memory(s) 104. The memory(s) 104 may be connected to the processor(s) 102 and may store various pieces of information related to operations of the processor(s) 102. For example, the memory(s) 104 may store software code including instructions for performing all or a part of processes controlled by the processor(s) 102 or for performing the descriptions, functions, procedures, proposals, methods, and/or operation flowcharts disclosed in this document. The processor(s) 102 and the memory(s) 104 may be a part of a communication modem/circuit/chip designed to implement RAT (e.g., LTE or NR). The transceiver(s) 106 may be connected to the processor(s) 102 and transmit and/or receive wireless signals through the one or more antennas 108. Each of the transceiver(s) 106 may include a transmitter and/or a receiver. The transceiver(s) 106 may be interchangeably used with radio frequency (RF) unit(s). In the present disclosure, the wireless device may be a communication modem/circuit/chip.

Specifically, instructions and/or operations that are controlled by the processor 102 of the first wireless device 100 and stored in the memory 104 according to an embodiment of the present disclosure will be described.

While the following operations are described based on a control operation of the processor 102 in terms of the processor 102, software code for performing such operations may be stored in the memory 104.

The processor 102 may control the transceiver 106 to receive a PRS configuration from a BS and/or a location server. In this case, an example of the PRS configuration controlled to be received by the processor 102 may conform to steps #1 and #2 of Embodiment 1, steps #1 and #2 of Embodiment 2, step #1 of Embodiment 3, and Embodiment 5, Embodiment 6, and/or Embodiment 8.

The processor 102 may control the transceiver 106 to receive a narrowband-based PRS from the second wireless device 200. In this case, a specific embodiment for receiving the narrowband-based PRS may conform to step #2 of Embodiment 1 and/or step #2 of Embodiment 2.

The processor 102 may adjust a PRS search window according to the PRS configuration based on the received narrowband-based PRS and control the transceiver 106 to receive a wideband-based PRS within the adjusted PRS search window. In this case, before adjusting the PRS search window or after adjusting the PRS search window, the processor 102 may select a BS/TP based on Embodiment 4. In addition, the operation in which the processor 102 adjusts the PRS search window and controls the transceiver 106 to receive the wideband-based PRS may be performed based on step #3 of Embodiment 1 and/or step #3 of Embodiment 2, specifically, based on steps #2 and #3 of Embodiment 3.

Figure 24:
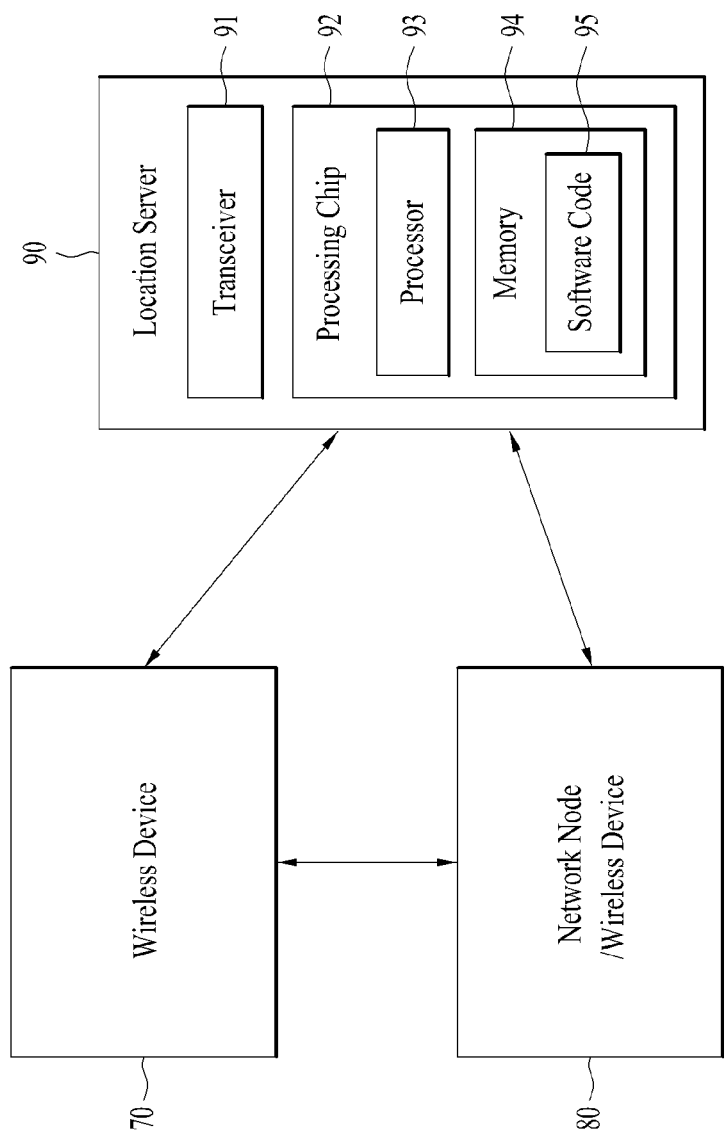
FIG. 24 illustrates an exemplary location server to which embodiments of the present disclosure are applied.

The processor 102 may control the transceiver 106 to report an RSTD, a TOA, etc., which are finally measured based on the received narrowband-based PRS and/or wideband-based PRS, to the second wireless device 100 and/or to a location server 90 of FIG. 24. A specific embodiment for this operation may be based on step #4 of Embodiment 1, step #4 of Embodiment 2, and/or Embodiment 7.

The second wireless device 200 may include one or more processors 202 and one or more memories 204, and further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operation flowcharts disclosed in this document. For example, the processor(s) 202 may process information in the memory(s) 204 to generate third information/signals and then transmit wireless signals including the third information/signals through the transceiver(s) 206. The processor(s) 202 may receive wireless signals including fourth information/signals through the transceiver(s) 106 and then store information obtained by processing the fourth information/signals in the memory(s) 204. The memory(s) 204 may be connected to the processor(s) 202 and store various pieces of information related to operations of the processor(s) 202. For example, the memory(s) 204 may store software code including instructions for performing all or a part of processes controlled by the processor(s) 202 or for performing the descriptions, functions, procedures, proposals, methods, and/or operation flowcharts disclosed in this document. The processor(s) 202 and the memory(s) 204 may be a part of a communication modem/circuit/chip designed to implement RAT (e.g., LTE or NR). The transceiver(s) 206 may be connected to the processor(s) 202 and transmit and/or receive wireless signals through the one or more antennas 208. Each of the transceiver(s) 206 may include a transmitter and/or a receiver. The transceiver(s) 206 may be interchangeably used with RF unit(s). In the present disclosure, the wireless device may be a communication modem/circuit/chip.

Specifically, instructions and/or operations that are controlled by the processor 202 of the second wireless device 200 and stored in the memory 204 according to an embodiment of the present disclosure will be described.

While the following operations are described based on a control operation of the processor 202 in terms of the processor 202, software code for performing such operations may be stored in the memory 204.

The processor 202 may control the transceiver 206 to transmit a PRS configuration to the first wireless device 100. In this case, an example of the PRS configuration controlled to be transmitted by the processor 202 may conform to steps #1 and #2 of Embodiment 1, steps #1 and #2 of Embodiment 2, step #1 of Embodiment 3, and Embodiment 5, Embodiment 6, and/or Embodiment 8. If the location server 90 of FIG. 24 transmits the PRS configuration to the first wireless device 100, the above process may be omitted.

The processor 202 may control the transceiver 106 to transmit a narrowband-based PRS to the first wireless device 100. In this case, a specific embodiment for transmitting the narrowband-based PRS may conform to step #2 of Embodiment 1 and/or step #2 of Embodiment 2.

If the first wireless device 100 adjusts a PRS search window using the narrowband-based PRS, the processor 202 may control the transceiver 206 to transmit a wideband-based PRS to the first wireless device 100 based on the PRS search window. A specific embodiment in which the processor 202 controls the transceiver 206 to transmit the wideband-based PRS may be performed based on step #3 of Embodiment 1 and/or step #3 of Embodiment 2, specifically, based on steps #2 and #3 of Embodiment 3. The second wireless device 200 including the processor 202 that controls the transceiver 206 to transmit the wideband-based PRS may be a TP/BS selected according to Embodiment 4.

Next, the processor 202 may control the transceiver 106 to receive a measurement report including an RSTD, a TOA, etc. from the first wireless device 100. In this case, a specific embodiment in which the processor 202 receives the measurement report from the first wireless device 100 may be based on step #4 of Embodiment 1, step #4 of Embodiment 2, and/or Embodiment 7. However, if the first wireless device 100 transmits the measurement report to the location server 90 of FIG. 24, the processor 202 may omit the process of controlling the transceiver 206 to receive the measurement report. When the processor 202 controls the transceiver 206 to receive the measurement report from the first wireless device 100, the processor 202 may control the transceiver 206 to transmit the received measurement report to the location server 90 of FIG. 24.

Now, hardware elements of the wireless devices 100 and 200 will be described in greater detail. One or more protocol layers may be implemented by, not limited to, one or more processors 102 and 202. For example, the one or more processors 102 and 202 may implement one or more layers (e.g., functional layers such as physical (PHY), medium access control (MAC), radio link control (RLC), packet data convergence protocol (PDCP), RRC, and service data adaptation protocol (SDAP)). The one or more processors 102 and 202 may generate one or more protocol data units (PDUs) and/or one or more service data Units (SDUs) according to the descriptions, functions, procedures, proposals, methods, and/or operation flowcharts disclosed in this document. The one or more processors 102 and 202 may generate messages, control information, data, or information according to the descriptions, functions, procedures, proposals, methods, and/or operation flowcharts disclosed in this document and provide the messages, control information, data, or information to one or more transceivers 106 and 206. The one or more processors 102 and 202 may generate signals (e.g., baseband signals) including PDUs, SDUs, messages, control information, data, or information according to the descriptions, functions, procedures, proposals, methods, and/or operation flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operation flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. For example, one or more application specific integrated circuits (ASICs), one or more digital signal processors (DSPs), one or more digital signal processing devices (DSPDs), one or more programmable logic devices (PLDs), or one or more field programmable gate arrays (FPGAs) may be included in the one or more processors 102 and 202. The descriptions, functions, procedures, proposals, methods, and/or operation flowcharts disclosed in this document may be implemented using firmware or software, and the firmware or software may be configured to include the modules, procedures, or functions. Firmware or software configured to perform the descriptions, functions, procedures, proposals, methods, and/or operation flowcharts disclosed in this document may be included in the one or more processors 102 and 202 or may be stored in the one or more memories 104 and 204 and executed by the one or more processors 102 and 202. The descriptions, functions, procedures, proposals, methods, and/or operation flowcharts disclosed in this document may be implemented using firmware or software in the form of code, an instruction, and/or a set of instructions.

The one or more memories 104 and 204 may be connected to the one or more processors 102 and 202 and store various types of data, signals, messages, information, programs, code, instructions, and/or commands. The one or more memories 104 and 204 may be configured to include read-only memories (ROMs), random access memories (RAMs), electrically erasable programmable read-only memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or wireless signals/channels, mentioned in the methods and/or operation flowcharts of this document, to one or more other devices. The one or more transceivers 106 and 206 may receive user data, control information, and/or wireless signals/channels, mentioned in the descriptions, functions, procedures, proposals, methods, and/or operation flowcharts disclosed in this document, from one or more other devices. For example, the one or more transceivers 106 and 206 may be connected to the one or more processors 102 and 202 and transmit and receive wireless signals. For example, the one or more processors 102 and 202 may perform control so that the one or more transceivers 106 and 206 may transmit user data, control information, or wireless signals to one or more other devices. The one or more processors 102 and 202 may perform control so that the one or more transceivers 106 and 206 may receive user data, control information, or wireless signals from one or more other devices. The one or more transceivers 106 and 206 may be connected to the one or more antennas 108 and 208 and the one or more transceivers 106 and 206 may be configured to transmit and receive user data, control information, and/or wireless signals/channels, mentioned in the descriptions, functions, procedures, proposals, methods, and/or operation flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received wireless signals/channels from RF band signals into baseband signals in order to process received user data, control information, and wireless signals/channels using the one or more processors 102 and 202. The one or more transceivers 106 and 206 may convert the user data, control information, and wireless signals/channels processed using the one or more processors 102 and 202 from the baseband signals into the RF band signals. To this end, the one or more transceivers 106 and 206 may include (analog) oscillators and/or filters.

Figure 21:
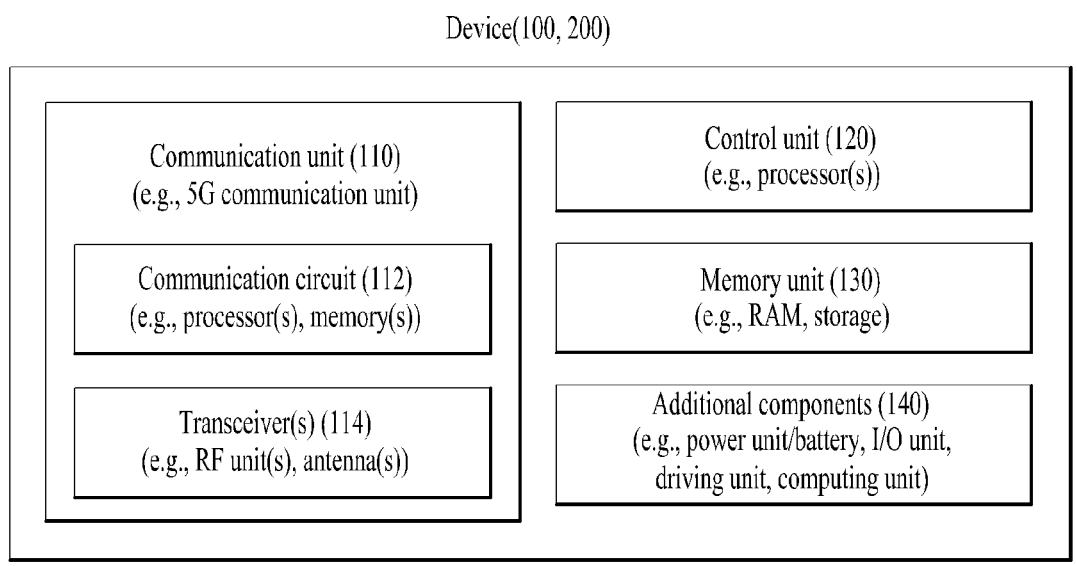

FIG. 21 illustrates another example of a wireless device applied to the present disclosure. The wireless device may be implemented in various forms according to a use case/service (refer to FIG. 19).

Referring to FIG. 21, wireless devices 100 and 200 may correspond to the wireless devices 100 and 200 of FIG. 20 and may be configured to include various elements, components, units/portions, and/or modules. For example, each of the wireless devices 100 and 200 may include a communication unit 110, a control unit 120, a memory unit 130, and additional components 140. The communication unit 110 may include a communication circuit 112 and transceiver(s) 114. For example, the communication circuit 112 may include the one or more processors 102 and 202 and/or the one or more memories 104 and 204 of FIG. 21. For example, the transceiver(s) 114 may include the one or more transceivers 106 and 206 and/or the one or more antennas 108 and 208 of FIG. 20. The control unit 120 is electrically connected to the communication unit 110, the memory 130, and the additional components 140 and provides overall control to the wireless device. For example, the control unit 120 may control an electric/mechanical operation of the wireless device based on programs/code/instructions/information stored in the memory unit 130. The control unit 120 may transmit the information stored in the memory unit 130 to the outside (e.g., other communication devices) via the communication unit 110 through a wireless/wired interface or store, in the memory unit 130, information received through the wireless/wired interface from the outside (e.g., other communication devices) via the communication unit 110.

The additional components 140 may be configured in various manners according to type of the wireless device. For example, the additional components 140 may include at least one of a power unit/battery, input/output (I/O) unit, a driving unit, and a computing unit. The wireless device may be implemented in the form of, not limited to, the robot (100a of FIG. 19), the vehicles (100b-1 and 100b-2 of FIG. 19), the XR device (100c of FIG. 19), the hand-held device (100d of FIG. 19), the home appliance (100e of FIG. 19), the IoT device (100f of FIG. 19), a digital broadcasting terminal, a hologram device, a public safety device, an MTC device, a medical device, a FinTech device (or a finance device), a security device, a climate/environment device, the AI server/device (400 of FIG. 19), the BSs (200 of FIG. 19), a network node, or the like. The wireless device may be mobile or fixed according to a use case/service.

In FIG. 21, all of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module in the wireless devices 100 and 200 may further include one or more elements. For example, the control unit 120 may be configured with a set of one or more processors. For example, the control unit 120 may be configured with a set of a communication control processor, an application processor, an electronic control unit (ECU), a graphical processing unit, and a memory control processor. In another example, the memory 130 may be configured with a RAM, a dynamic RAM (DRAM), a ROM, a flash memory, a volatile memory, a non-volatile memory, and/or a combination thereof.

The implementation example of FIG. 21 will hereinafter be described with reference to the attached drawings.

Figure 22:
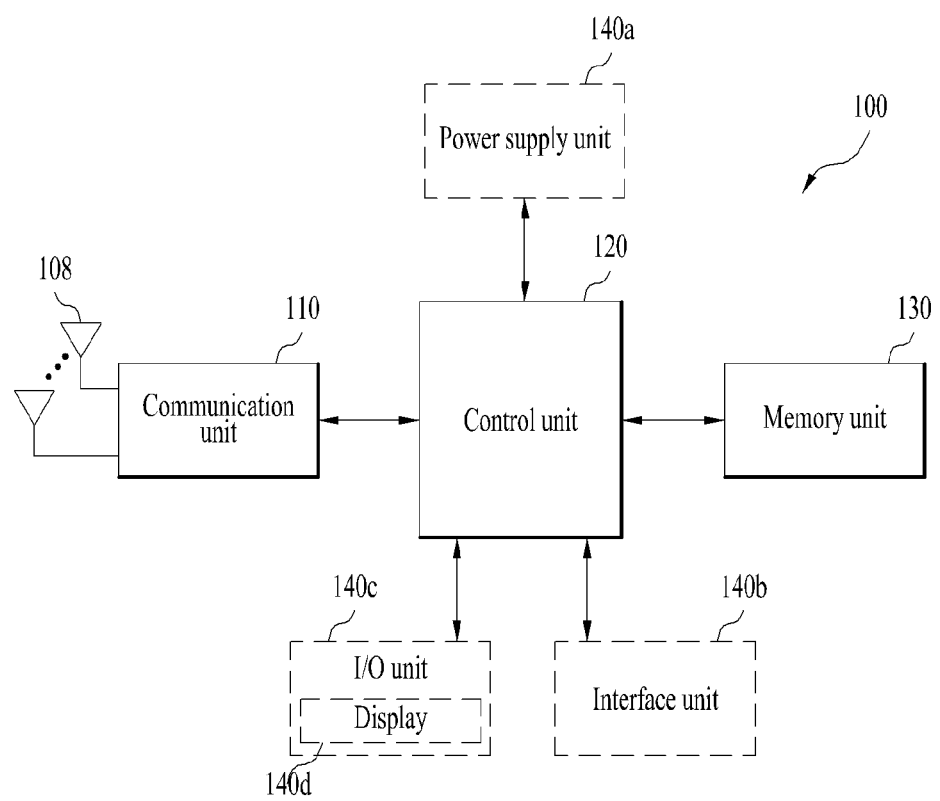

FIG. 22 is a block diagram illustrating a hand-held device 100 to which another embodiment of the present disclosure can be applied. The hand-held device may include a smartphone, a tablet (also called a smartpad), a wearable device (e.g., a smartwatch or smart glasses), and a portable computer (e.g., a laptop). The hand-held device 100 may be referred to as a mobile station (MS), a user terminal (UT), a mobile subscriber station (MSS), a subscriber station (SS), an advanced mobile station (AMS), or a wireless terminal (WT).

Referring to FIG. 22, the hand-held device 100 may include an antenna unit 108, a communication unit 110, a control unit 120, a memory unit 130, a power supply unit 140a, an interface unit 140b, and an input/output (I/O) unit 140c. The antenna unit 108 may be configured as a part of the communication unit 110. The blocks 110 to 130/140a to 140c correspond to the blocks 110 to 130/140 of FIG. 21, respectively.

The communication unit 110 may transmit and receive signals (e.g., data and control signals) to and from another wireless device and a BS. The control unit 120 may perform various operations by controlling elements of the hand-held device 100. The control unit 120 may include an application processor (AP). The memory unit 130 may store data/parameters/programs/code/commands required for operation of the hand-held device 100. Further, the memory unit 130 may store input/output data/information. The power supply unit 140a may supply power to the hand-held device 100, and include a wired/wireless charging circuit and a battery. The interface unit 140b may support connection between the hand-held device and other external devices. The interface unit 140b may include various ports (e.g., an audio I/O port and a video I/O port) for connection to external devices. The I/O unit 140c may receive or output video information/signal, audio information/signal, data, and/or user-input information. The I/O unit 140c may include a camera, a microphone, a user input unit, a display 140d, a speaker, and/or a haptic module.

For example, for data communication, the I/O unit 140c may acquire information/signals (e.g., touch, text, voice, images, and video) received from the user and store the acquired information/signals in the memory unit 130. The communication unit 110 may convert the information/signals into radio signals and transmit the radio signals directly to another device or to a BS. Further, the communication unit 110 may receive a radio signal from another device or a BS and then restore the received radio signal to original information/signal. The restored information/signal may be stored in the memory unit 130 and output in various forms (e.g., text, voice, an image, video, and a haptic effect) through the I/O unit 140c.

Figure 23:
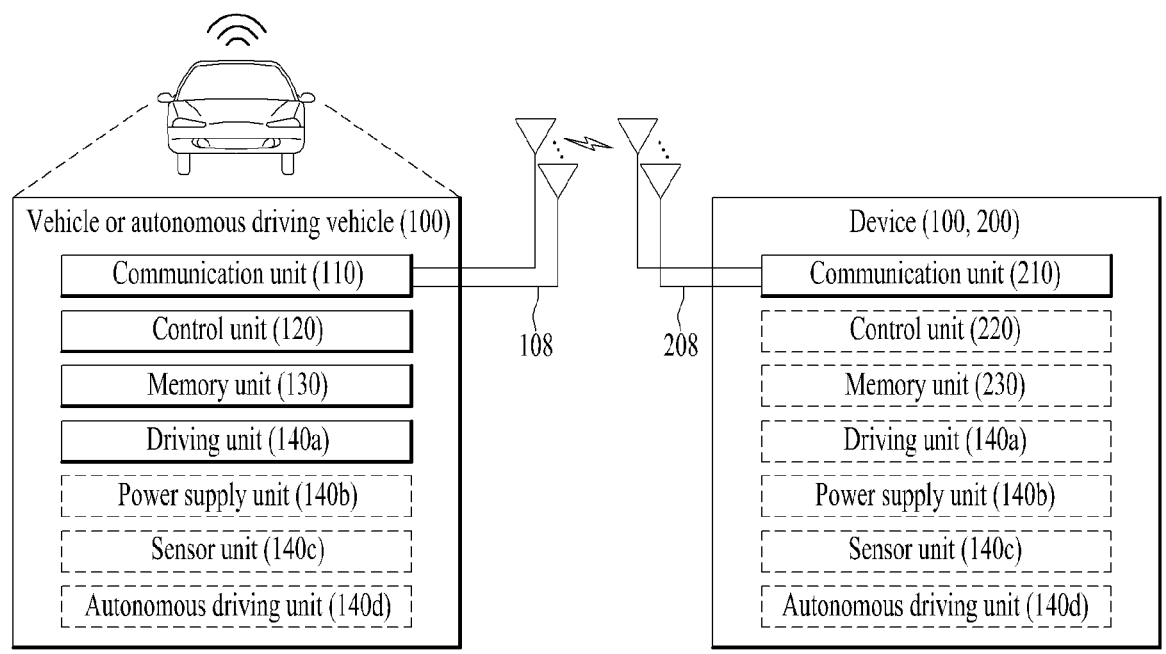

FIG. 23 illustrates a vehicle or an autonomous driving vehicle applied to the present disclosure. The vehicle or autonomous driving vehicle may be implemented as a mobile robot, a car, a train, a manned/unmanned aerial vehicle (AV), a ship, or the like.

Referring to FIG. 23, a vehicle or autonomous driving vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. 21, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous driving vehicle 100. The control unit 120 may include an ECU. The driving unit 140*a* may enable the vehicle or the autonomous driving vehicle 100 to drive on a road. The driving unit 140*a* may include an engine, a motor, a powertrain, a wheel, a brake, a steering device, and so on. The power supply unit 140*b* may supply power to the vehicle or the autonomous driving vehicle 100 and include a wired/wireless charging circuit, a battery, and so on. The sensor unit 140*c* may acquire information about a vehicle state, ambient environment information, user information, and so on. The sensor unit 140*c* may include an inertial measurement unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, and so on. The autonomous driving unit 140*d* may implement technology for maintaining a lane on which the vehicle is driving, technology for automatically adjusting speed, such as adaptive cruise control, technology for autonomously driving along a determined path, technology for driving by automatically setting a route if a destination is set, and the like.

For example, the communication unit 110 may receive map data, traffic information data, and so on from an external server. The autonomous driving unit 140*d* may generate an autonomous driving route and a driving plan from the obtained data. The control unit 120 may control the driving unit 140*a* such that the vehicle or autonomous driving vehicle 100 may move along the autonomous driving route according to the driving plan (e.g., speed/direction control). During autonomous driving, the communication unit 110 may aperiodically/periodically acquire recent traffic information data from the external server and acquire surrounding traffic information data from neighboring vehicles. During autonomous driving, the sensor unit 140*c* may obtain information about a vehicle state and/or surrounding environment information. The autonomous driving unit 140*d* may update the autonomous driving route and the driving plan based on the newly obtained data/information. The communication unit 110 may transfer information about a vehicle position, the autonomous driving route, and/or the driving plan to the external server. The external server may predict traffic information data using AI technology based on the information collected from vehicles or autonomous driving vehicles and provide the predicted traffic information data to the vehicles or the autonomous driving vehicles.

To perform the method of transmitting the PRS and performing positioning using the PRS according to the present disclosure, the location server 90 as illustrated in FIG. 24 may be provided. The location server 90 may be logically or physically connected to a wireless device 70 and/or a network node 80. The wireless device 70 may be the first wireless device 100 of FIG. 20 and/or the wireless device 100 or 200 of FIG. 21. The network node 80 may be the second wireless device 100 of FIG. 20 and/or the wireless device 100 or 200 of FIG. 21.

The location server 90 may be, without being limited to, an AMF, an LMF, an E-SMLC, and/or an SLP and may be any device only if the device serves as the location server 90 for implementing the embodiments of the present disclosure. Although the location server 90 is referred to as a location server for convenience of description, the location server 90 may be implemented not as a server but as a chip. Such a chip may be implemented to perform all functions of the location server 90 which will be described below.

Specifically, the location server 90 includes a transceiver 91 for communicating with one or more other wireless devices, network nodes, and/or other elements of a network. The transceiver 91 may include one or more communication interfaces. The transceiver 91 communicates with one or more other wireless devices, network nodes, and/or other elements of the network connected through the communication interfaces.

The location server 90 includes a processing chip 92. The processing chip 92 may include at least one processor, such as a processor 93, and at least one memory device, such as a memory 94.

The processing chip 92 may control one or more processes to implement the methods described in this specification and/or embodiments for problems to be solved by this specification and solutions to the problems. In other words, the processing chip 92 may be configured to perform at least one of the embodiments described in this specification. That is, the processor 93 includes at least one processor for performing the function of the location server 90 described in this specification. For example, one or more processors may control the one or more transceivers 91 of FIG. 24 to transmit and receive information.

The processing chip 92 includes a memory 94 configured to store data, programmable software code, and/or other information for performing the embodiments described in this specification.

In other words, in the embodiments according to the present specification, when the memory 94 is executed by at least one processor such as the processor 93, the memory 94 allows the processor 93 to perform some or all of the processes controlled by the processor 93 of FIG. 24 or stores software code 95 including instructions for performing the embodiments described in this specification.

Specifically, instructions and/or operations, which are controlled by the processor 93 of the location server 90 and are stored in the memory 94, according to an embodiment of the present disclosure will now be described.

While the following operations will be described in the context of a control operation of the processor 93 from the perspective of the processor 93, software code for performing these operations may be stored in the memory 94.

The processor 93 may control the transceiver 91 to transmit a PRS configuration to the wireless device 70. In this case, an example of the PRS configuration that the processor 93 controls the transceiver 91 to transmit may conform to steps #1 and #2 of Embodiment 1, steps #1 and #2 of Embodiment 2, step #1 of Embodiment 3, and Embodiment 5, Embodiment 6, and/or Embodiment 8. If the network node 80 transmits the PRS configuration to the wireless device 70 the above process may be omitted. The processor 93 may control the transceiver 91 to receive a measurement report including an RSTD, a TOA, etc. from the wireless device 70 and/or the network node 80. A specific embodiment in which the processor 93 controls the transceiver 91 to receive the measurement reporting from the wireless device 70 and/or the network node 80 may be based on step #4 of Embodiment 1, step #4 of Embodiment 2, and/or Embodiment 7.

Figure 25:
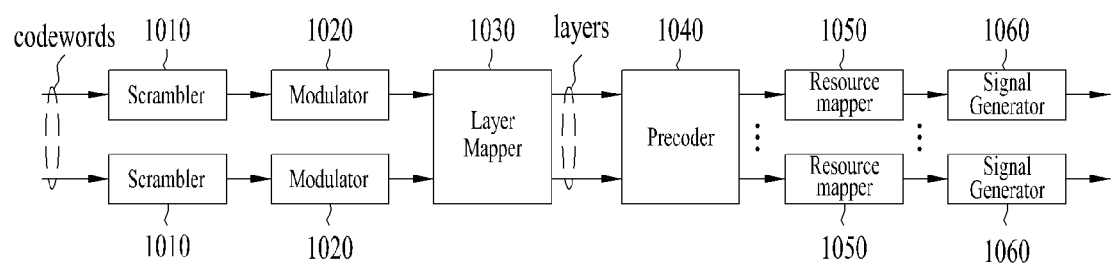
FIG. 25 illustrates an exemplary signal processing circuit to which embodiments of the present disclosure are applied.

FIG. 25 illustrates a signal processing circuit for transmission (Tx) signals.

Referring to FIG. 25, a signal processing circuit 1000 may include a scrambler 1010, a modulator 1020, a layer mapper 1030, a precoder 1040, a resource mapper 1050, and a signal generator 1060. The operations/functions shown in FIG. 25 may be performed by the processors 102 and 202 and/or the transceivers 106 and 206 shown in FIG. 20, without being limited thereto. Hardware elements shown in FIG. 25 may be implemented by the processors 102 and 202 and/or the transceivers 106 and 206 shown in FIG. 20. For example, the blocks 1010 to 1060 may be implemented by the processors 102 and 202. In addition, the blocks 1010 to 1050 may be implemented by the processors 102 and 202 shown in FIG. 20, and the block 1060 may be implemented by the transceivers 106 and 206 shown in FIG. 20.

The codeword may be converted into a radio signal (or a radio frequency (RF) signal) through the signal processing circuit 1000 shown in FIG. 25. Here, the codeword may be a coded bit sequence of an information block. The information block may include a transmission (Tx) block (e.g., UL-SCH transmission block, and/or DL-SCH transmission block). The radio signal may be transmitted through various physical channels (e.g., PUSCH, and PDSCH).

In more detail, the codeword may be converted into a bit sequence scrambled by the scrambler 1010. The scramble sequence used for such scrambling may be generated based on an initialization value, and the initialization value may include ID information of a wireless device, etc. The scrambled bit-sequence may be modulated into a modulated symbol sequence by the demodulator 1020. The modulation scheme may include pi/2-BPSK(pi/2-Binary Phase Shift Keying), m-PSK (m-Phase Shift Keying), m-QAM (m-Quadrature Amplitude Modulation), etc. The complex modulated symbol sequence may be mapped to one or more transmission (Tx) layers by the layer mapper 1030. Modulated symbols of the respective Tx layers may be mapped (precoded) to the corresponding antenna port(s) by the precoder 1040. The output value (z) of the precoder 1040 may be obtained by multiplying the output value (y) of the layer mapper 1030 by the (N×M) precoding matrix (W). In this case, N is the number of antenna ports, and M is the number of Tx layers. In this case, the precoder 1040 may perform precoding after transform precoding (e.g., DFT transform) is performed on the complex modulated symbols. In this case, the precoder 1040 may perform precoding without performing transform precoding.

The resource mapper 1050 may map the modulated symbols of the respective antenna ports to time-frequency resources. The time-frequency resources may include a plurality of symbols (e.g., CP-OFDMA symbol and DFT-s-OFDMA symbol) in the time domain, and may include a plurality of subcarriers in the frequency domain. The signal generator 1060 may generate radio signals from the mapped modulated symbols, and the generated radio signals may be transferred to other devices through the respective antennas. To this end, the signal generator 1060 may include an inverse fast Fourier transform (IFFT) module, a cyclic prefix (CP) inserter, a digital-to-analog converter (DAC), a frequency uplink converter, etc.

The signal processing steps for reception (Rx) signals in the wireless device may be arranged in the reverse order of the signal processing steps 1010 to 1060 shown in FIG. 25. For example, the wireless devices 100 and 200 (shown in FIG. 20) may receive radio signals from the outside through the antenna ports/transceivers. The received radio signals may be converted into a baseband signal through a signal restorer. To this end, the signal restorer may include a frequency downlink converter, an analog-to-digital converter (ADC), a CP remover, and a fast Fourier transform (FFT) module. Thereafter, the baseband signal may be restored to the codeword after passing through the resource demapper process, the postcoding process, the demodulation process, and the descrambling process. The codeword may be restored to an original information block through decoding. Therefore, the signal processing circuit (not shown) for Rx signals may include a signal restorer, a resource demapper, a postcoder, a demodulator, a descrambler, and a decoder.

The embodiments of the present disclosure described herein below are combinations of elements and features of the present disclosure. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions of any one embodiment may be included in another embodiment and may be replaced with corresponding constructions of another embodiment. It will be obvious to those skilled in the art that claims that are not explicitly cited in each other in the appended claims may be presented in combination as an embodiment of the present disclosure or included as a new claim by a subsequent amendment after the application is filed.

In the embodiments of the present disclosure, a description is made centering on a data transmission and reception relationship among a BS, a relay, and an MS. In some cases, a specific operation described as performed by the BS may be performed by an upper node of the BS. Namely, it is apparent that, in a network comprised of a plurality of network nodes including a BS, various operations performed for communication with an MS may be performed by the BS, or network nodes other than the BS. The term 'BS' may be replaced with the term 'fixed station', 'Node B', 'enhanced Node B (eNode B or eNB)', 'access point', etc.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

INDUSTRIAL APPLICABILITY

While the above-described method of transmitting and receiving the PRS and the apparatus therefor have been described in the context of the 5G NR system, the method and apparatus are also applicable to various other wireless communication systems.

The invention claimed is:

1. A method for receiving a Positioning Reference Signal (PRS) by a user equipment (UE) in a wireless communication system, the method comprising:
   receiving, from a location server, first information related to one or more PRS resource sets;
   receiving, from the location server, second information related to one or more transmission (Tx) beams for each of one or more PRS resources included in each of the one or more PRS resource sets; and
   receiving, from one or more Transmission and Reception Points (TRPs), PRSs thorough a plurality of PRS resources,
   wherein, based on the plurality of PRS resources being included in the same PRS resource set among the one or more PRS resource sets, it is determined that the PRSs are received from the same TRP associated with the same PRS resource set among the one or more TRPs, and wherein each of the plurality of PRS resources included in the same PRS resource set corresponds to different transmission (Tx) beams of the same TRP.

2. The method of claim 1, wherein, based on Quasi Co Location (QCL) being configured between a first PRS resource and a second PRS resource, the first PRS resource and the second PRS resource are transmitted from the same TRP.

3. The method of claim 1, further comprising:
receiving, from the location server, third information for at least one Reference Signal Timing Difference (RSTD) table,
wherein the at least one RSTD table includes reported RSTD values, and
wherein each of the reported RSTD values is associated with each of a number of ranges for measured RSTD.

4. The method of claim 3, further comprising:
measuring RSTD based on the PRSs;
obtaining, from the at least one RSTD table, a reported RSTD value associated with the measured RSTD; and
reporting, to the location server, the reported RSTD value.

5. The method of claim 1, wherein the location server is a Location Management Function (LMF).

6. An apparatus configured for receiving a Positioning Reference Signal (PRS) in a wireless communication system, the apparatus comprising:
at least one processor; and
at least one computer memory operably connectable to the at least one processor and storing instructions that, when executed by the at least one processor, perform operations comprising:
receiving, from a location server, first information related to one or more PRS resource sets,
receiving, from the location server, second information related to one or more transmission (Tx) beams for each of one or more PRS resources included in each of the one or more PRS resource sets; and
receiving, from one or more Transmission and Reception Point (TRP)s, PRSs through a plurality of PRS resources,
wherein, based on the plurality of PRS resources being included in the same PRS resource set among the one or more PRS resource sets, it is determined that the PRSs are received from the same TRP associated with the same PRS resource set among the one or more TRPs, and
wherein each of the plurality of PRS resources included in the same PRS resource set corresponds to different transmission (Tx) beams of the same TRP.

7. The apparatus of claim 6, wherein, based on Quasi Co Location (QCL) being configured between a first PRS resource and a second PRS resource, the first PRS resource and the second PRS resource are transmitted from the same TRP.

8. The apparatus of claim 6, the operations further comprising:
receiving, from the location server, third information for at least one Reference Signal Timing Difference (RSTD) table,
wherein the at least one RSTD table includes reported RSTD values, and
wherein each of the reported RSTD values is associated with each of a number of ranges for measured RSTD.

9. The apparatus of claim 8, the operation further comprising:
measuring RSTD based on the PRSs;
obtaining, from the at least one RSTD table, a reported RSTD value associated with the measured RSTD; and
reporting, to the location server, the reported RSTD value.

10. The apparatus of claim 6, wherein the location server is a Location Management Function (LMF).

11. A method for receiving information related to a Reference Signal Timing Difference (RSTD) by a location server in a wireless communication system, the method comprising:
transmitting, to a user equipment (UE), first information related to one or more PRS resource sets,
transmitting, to the UE, second information related to one or more transmission (Tx) beams for each of one or more PRS resources included in each of the one or more PRS resource sets; and
receiving, from the UE, third information related to RSTD,
wherein the RSTD is measured based on a plurality of PRS resources, and
wherein, based on the plurality of PRS resources being included in the same PRS resource set among the one or more PRS resource sets, it is determined that PRSs, which are transmitted through the plurality of PRS resources, are transmitted from the same TRP associated with the same PRS resource set among the one or more TRPs, and
wherein each of the plurality of PRS resources included in the same PRS resource set corresponds to different transmission (Tx) beams of the same TRP.

12. The method of claim 11, wherein, based on Quasi Co Location (QCL) being configured between a first PRS resource and a second PRS resource, the first PRS resource and the second PRS resource are transmitted from the same TRP.

13. The method of claim 11, further comprising:
transmitting, to the UE, fourth information for at least one Reference Signal Timing Difference (RSTD) table,
wherein the at least one RSTD table includes reported RSTD values, and
wherein each of the reported RSTD values is associated with each of a number of ranges for measured RSTD.

14. The method of claim 13, further comprising:
receiving, from the UE, fifth information related to a reported RSTD value associated with RSTD measured by the UE.

15. The method of claim 13, wherein the location server is a Location Management Function (LMF).

* * * * *